US012747943B2

(12) United States Patent
Feler

(10) Patent No.: US 12,747,943 B2
(45) Date of Patent: Sep. 29, 2026

(54) MOSAIC OVERLAY TARGETS

(71) Applicant: KLA Corporation, Milpitas, CA (US)

(72) Inventor: Yoel Feler, Haifa (IL)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/131,163

(22) Filed: Apr. 5, 2023

(65) Prior Publication Data

US 2024/0110780 A1 Apr. 4, 2024

Related U.S. Application Data

(60) Provisional application No. 63/411,640, filed on Sep. 30, 2022.

(51) Int. Cl.
*G01B 11/24* (2006.01)

(52) U.S. Cl.
CPC .................................... *G01B 11/24* (2013.01)

(58) Field of Classification Search
CPC . G01B 11/24; G01B 1/00; G01B 3/00; G01B 5/00; G01B 7/00; G01B 9/00; G01B 11/00; G01B 13/00; G01B 15/00; G01B 17/00; G01B 21/00; G01B 2210/00; G01B 2290/00
See application file for complete search history.

(56) References Cited

U.S. PATENT DOCUMENTS 7,277,172 B2 10/2007 Kandel et al.
7,616,313 B2 11/2009 Kandel et al.
7,884,936 B2 2/2011 Manassen
8,004,679 B2 8/2011 Levinski et al.
8,848,186 B2 9/2014 Kandel et al.
9,739,702 B2 8/2017 Bringoltz et al.
2012/0206703 A1 8/2012 Bhattacharyya et al.
(Continued)

FOREIGN PATENT DOCUMENTS

CN 113939772 A 1/2022
WO 2015013621 A1 1/2015
WO 2021247384 A1 12/2021

OTHER PUBLICATIONS

Korean Intellectual Property Office, International Search Report and Written Opinion received in International Application No. PCT/US2023/033679, Jan. 16, 2024, 6 pages.
(Continued)

*Primary Examiner* — Tri T Ton
(74) *Attorney, Agent, or Firm* — Suiter Swantz IP

(57) ABSTRACT

A mosaic overlay target may include two or more cell sets distributed across a sample, wherein each cell set includes one or more cells, where each cell set is oriented to have at least one of mirror symmetry with respect to a central axis of the mosaic overlay target or rotational symmetry with respect to a central point of the mosaic overlay target. The cell sets may be configured according to a metrology recipe such that images of the mosaic overlay target generated based on the metrology recipe include metrology data suitable for two or more overlay measurements. A particular one of the overlay measurements may be based on portions of the images associated with at least one of the cell sets. At least two of the two or more overlay measurements may be alternative measurements of a common property of the sample.

20 Claims, 13 Drawing Sheets

(56) References Cited

U.S. PATENT DOCUMENTS

| | | | | |
|---|---|---|---|---|
| 2016/0047744 | A1* | 2/2016 | Adel | G03F 7/70633 356/243.1 |
| 2018/0275530 | A1 | 9/2018 | Kandel et al. | |
| 2018/0364179 | A1 | 12/2018 | Gready | |
| 2019/0041329 | A1 | 2/2019 | Hill et al. | |
| 2019/0155174 | A1 | 5/2019 | Kim et al. | |
| 2021/0333218 | A1* | 10/2021 | Feler | G01N 21/8851 |
| 2021/0364279 | A1* | 11/2021 | Manassen | G03F 7/706849 |
| 2022/0283514 | A1 | 9/2022 | Hill et al. | |
| 2022/0357674 | A1 | 11/2022 | Hill et al. | |

OTHER PUBLICATIONS

Chinese Patent Office, Office Action received in CN Application No. 202380041603.3, Jun. 5, 2025, 12 pages (including translation).

European Patent Office, Supplementary European Search Report for Application No. EP23873520 dated Apr. 14, 2026, 13 pages.

* cited by examiner

700

MOSAIC OVERLAY TARGETS

CROSS-REFERENCE TO RELATED APPLICATION

The present application claims the benefit under 35 U.S.C. § 119(e) of U.S. Provisional Application Ser. No. 63/411,640, filed Sep. 30, 2022, entitled MOSAIC TARGETS AND THEIR MEASUREMENTS MEASUREMENT CONCEPTS, naming Yoel Feler as inventor, which is incorporated herein by reference in the entirety.

TECHNICAL FIELD

The present disclosure relates generally to overlay targets and, more particularly, to metrology targets providing multiple alternative overlay measurements.

BACKGROUND

Overlay metrology measurements (e.g., overlay measurements) characterize relative registrations (or misregistrations) of different layers of a sample. Image-based overlay techniques typically generate an overlay measurement based on relative positions of imaged overlay target features. As the size of fabricated features decreases and the feature density increases, the demands on overlay metrology systems needed to characterize these features increase. Different overlay metrology techniques may provide different tradeoffs between accuracy, repeatability, or throughput. There is therefore a need to develop systems and methods to cure the above deficiencies.

SUMMARY

A mosaic overlay target is disclosed, in accordance with one or more illustrative embodiments of the present disclosure. In one illustrative embodiment, the target includes two or more cell sets distributed across a sample, where each cell set includes one or more cells, and where each cell set is oriented to have at least one of mirror symmetry with respect to a central axis of the mosaic overlay target or rotational symmetry with respect to a central point of the mosaic overlay target. In another illustrative embodiment, the two or more cell sets are configured according to a metrology recipe such that one or more images of the mosaic overlay target generated in accordance with the metrology recipe include metrology data suitable for two or more overlay measurements, where a particular one of the two or more overlay measurements is based on portions of the one or more images associated with at least one of the two or more cell sets. In another illustrative embodiment, at least two of the two or more overlay measurements are alternative measurements of a common property of the sample, wherein at least two of the two or more cell sets are configured in accordance with the metrology recipe to provide alternative portions of the metrology data associated with the alternative measurements.

An overlay metrology system is disclosed in accordance with one or more illustrative embodiments of the present disclosure. In one illustrative embodiment, the system includes an illumination source configured to generate one or more illumination beams. In another illustrative embodiment, the system includes one or more optical elements configured to illuminate a mosaic overlay target on a sample with the one or more illumination beams when implementing a metrology recipe. In another illustrative embodiment, the target includes two or more cell sets distributed across a sample, where each cell set includes one or more cells, wherein each cell set is oriented to have at least one of mirror symmetry with respect to a central axis of the mosaic overlay target or rotational symmetry with respect to a central point of the mosaic overlay target. In another illustrative embodiment, the two or more cell sets are configured according to a metrology recipe such that one or more images of the mosaic overlay target generated in accordance with the metrology recipe include metrology data suitable for two or more overlay measurements, where a particular one of the two or more overlay measurements is based on portions of the one or more images associated with at least one of the two or more cell sets. In another illustrative embodiment, at least two of the two or more overlay measurements are alternative measurements of a common property of the sample, where at least two of the two or more cell sets are configured in accordance with the metrology recipe to provide alternative portions of the metrology data associated with the alternative measurements. In another illustrative embodiment, the system includes one or more detectors to generate the one or more images of the mosaic overlay target based on the illumination from the one or more illumination beams when implementing the metrology recipe. In another illustrative embodiment, the system includes a controller. In another illustrative embodiment, the controller implements the metrology recipe by receiving the one or more images of the mosaic overlay target generating at least two overlay measurements of the sample based on the one or more images. In another illustrative embodiment, a particular one of the two or more overlay measurements is based on portions of the one or more images associated with at least one of the two or more cell sets, where at least two of the two or more overlay measurements are alternative measurements of a common property of the sample, and where at least two of the two or more cell sets are configured in accordance with the metrology recipe to provide alternative portions of the metrology data associated with the alternative measurements.

An overlay metrology method is disclosed in accordance with one or more illustrative embodiments of the present disclosure. In one illustrative embodiment, the method includes illuminating one or more mosaic overlay targets on a sample with one or more illumination beams in accordance with a metrology recipe, where each of the mosaic overlay targets includes two or more cell sets distributed across a sample. In another illustrative embodiment, each cell set includes one or more cells, where each cell set is oriented to have at least one of mirror symmetry with respect to a central axis of the mosaic overlay target or rotational symmetry with respect to a central point of the mosaic overlay target, where the two or more cell sets are configured according to the metrology recipe such that one or more images of the mosaic overlay target generated in accordance with the metrology recipe include metrology data suitable for two or more overlay measurements, and where a particular one of the two or more overlay measurements is based on portions of the one or more images associated with at least one of the two or more cell sets. In another illustrative embodiment, the method includes generating the one or more images of the mosaic overlay target based on the illumination from the one or more illumination beams. In another illustrative embodiment, the method includes generating at least two overlay measurements of the sample based on the one or more images, where a particular one of the two or more overlay measurements is based on portions of the one or more images associated with at least one of the two or more cell sets, where at least two of the two or more overlay measurements are alternative measurements of a common property of the sample, and where at least two of the two or more cell sets are configured in accordance with the metrology recipe to provide alternative portions of the metrology data associated with the alternative measurements.

A method for designing a mosaic overlay target is disclosed in accordance with one or more illustrative embodiments of the present disclosure. In one illustrative embodiment, the method includes selecting two or more overlay measurements for generation with a mosaic overlay target. In another illustrative embodiment, the method includes designing two or more cell sets of the mosaic overlay target. In another illustrative embodiment, the target includes two or more cell sets distributed across a sample, wherein each cell set includes one or more cells, where each cell set is oriented to have at least one of mirror symmetry with respect to a central axis of the mosaic overlay target or rotational symmetry with respect to a central point of the mosaic overlay target, where the two or more cell sets are configured according to a metrology recipe such that one or more images of the mosaic overlay target generated in accordance with the metrology recipe include metrology data suitable for the two or more overlay measurements, and where a particular one of the two or more overlay measurements is based on portions of the one or more images associated with at least one of the two or more cell sets. In another illustrative embodiment, at least two of the two or more overlay measurements are alternative measurements of a common property of the sample, where at least two of the two or more cell sets are configured in accordance with the metrology recipe to provide alternative portions of the metrology data associated with the alternative measurements.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
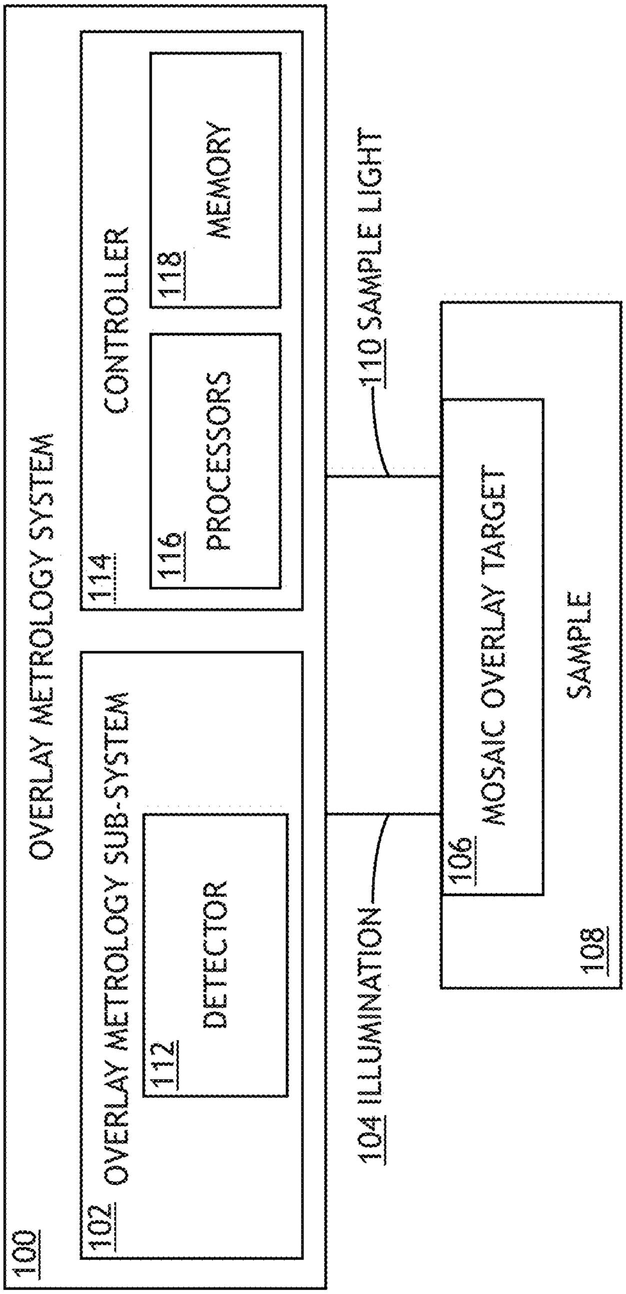
FIG. 1A is a conceptual view illustrating an overlay metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure relate to systems and methods for overlay metrology based on imaging a mosaic overlay target, where the mosaic overlay target is designed to provide multiple overlay measurements based on different portions of one or more images of the mosaic overlay target.

For the purposes of the present disclosure, the term overlay is generally used to describe relative positions of features on a sample fabricated by two or more patterning steps (e.g., lithographic exposure and subsequent etching steps, direct etch steps, or the like), where the term overlay error describes a deviation of the features from a nominal arrangement. For example, a multi-layered device may include features patterned on multiple sample layers using different patterning steps for each layer, where the alignment of features between layers must typically be tightly controlled to ensure proper performance of the resulting device. Accordingly, an overlay measurement may characterize the relative positions of features on two or more of the sample layers. By way of another example, multiple patterning steps may be used to fabricate features on a single sample layer. Such techniques, commonly called double-patterning or multiple-patterning techniques, may facilitate the fabrication of highly dense features near the resolution of the lithography system. An overlay measurement in this context may characterize the relative positions of the features from the different lithography steps on this single layer. It is to be understood that examples and illustrations throughout the present disclosure relating to a particular application of overlay metrology are provided for illustrative purposes only and should not be interpreted as limiting the disclosure.

In some embodiments, a mosaic overlay target includes multiple cell sets distributed across a sample, where each cell set may include one or more cells, and where different cell sets may include different arrangements of features suitable for facilitating overlay measurements.

A mosaic overlay target may be designed to facilitate multiple simultaneous overlay measurements (e.g., two or more overlay measurements) based on one or more images of the mosaic overlay target, where different overlay measurements are based on different portions of the images including different cell sets or different combinations of cell sets. As used herein, the term simultaneous overlay measurements is used broadly to indicate that multiple overlay measurements may be generated based on a single set of one or more images of the mosaic overlay target (e.g., taken with different illumination and/or imaging conditions) based on different portions of the one or more images. It is recognized herein that some overlay measurement techniques may generate a measurement based on a single image of an overlay target, whereas other techniques may generate a measurement based on multiple images of an overlay target (e.g., taken with different illumination and/or imaging conditions). It is contemplated herein that a mosaic overlay target may enable substantial flexibility in overlay metrology, may efficiently utilize space on a sample (e.g., provide a relatively small target size), and/or may enable high-throughput measurements.

As an illustration, an overlay metrology tool may illuminate the mosaic overlay target with illumination, collect light emanating (e.g., sample light) from the mosaic overlay target in response to this illumination, and generate one or more images of the mosaic overlay target based on at least a portion of this sample light. Such images may include any combination of field-plane images where a detector is located in a field plane conjugate to the mosaic overlay target (or a sample on which the mosaic overlay target is fabricated) or pupil-plane images where a detector is located in a pupil plane associated with an angular distribution of the light emanating from the sample.

Each cell set on the mosaic overlay target may be designed to facilitate an overlay measurement either alone or in combination with one or more additional cell sets. Put another way, each cell set may include features designed such that an overlay measurement may be generated based on an image of the cell set alone or an image of two or more cell sets. An image of the mosaic overlay target may thus be considered a composite of images of the various cell sets such that the various cell sets may be imaged simultaneously.

A cell may include any distribution of features associated with one or more patterning processes suitable for at least one overlay measurement. Further, such features may be non-periodic or may be periodic (e.g., exhibit distinct spatial frequencies) in one or more directions. For example, a cell may include overlapping features associated with two or more patterning processes such that an image of the cell may include information associated with the two or more processes. As another example, a cell may include features associated with a single patterning process. In this configuration, an overlay measurement may be based on cells (or cell sets), each including features associated with a different patterning process.

In a general sense, a mosaic overlay target may include cells having any size or shape. However, it may be desirable in some applications to design the cell sets with rotational and/or mirror symmetry to mitigate undesirable effects such as, but not limited to, tool induced shift (TIS) errors. For example, a cell set may include one or more pairs of cells (e.g., cell pairs) arranged to have mirror symmetry relative to a central axis of the cell set and/or rotational symmetry relative to a central point of the cell set (e.g., 180-degree symmetry, 90-degree symmetry, or the like). As another example, a cell set may include a single cell having mirror and/or rotational symmetry. Further, the various cell sets of a mosaic overlay target may be arranged to all share a common symmetry (e.g., share a common central axis and/or central point), though in some cases cell sets may be intentionally offset in accordance with an overlay metrology technique. In this configuration, a mosaic overlay target may include at least one cell set with one or more cell pairs arranged with selected symmetry and optionally a central cell set with a single cell also arranged with the selected symmetry.

A mosaic overlay target may support multiple overlay measurements based on different cell sets or combinations of cell sets. For example, different overlay measurements may be generated based on portions of one or more images of a mosaic overlay target associated with different cell sets or different combinations of cell sets.

It is recognized herein that the accuracy and/or sensitivity of an overlay measurement may depend on a variety of factors such as, but not limited to, a layout of features on a sample that are characterized during a measurement (e.g., sizes and/or orientations of the features, thicknesses of sample layers, or the like), properties of illumination used to facilitate the measurement (e.g., spectrum, polarization, incidence angle, beam shape, or the like), properties of light emanating from the sample used during a measurement (e.g., spectrum, polarization, emitted angle, or the like), or a focal position of the sample (e.g., a working distance between the sample and an overlay metrology tool). As a result, process variations across a particular sample and/or between samples in a lot (e.g., layer thickness variations, or the like) may impact both actual overlay errors (e.g., misregistrations between sample layers) as well as the accuracy and/or sensitivity of a particular overlay measurement technique used to measure the overlay errors.

Numerous overlay metrology techniques have been developed that may require or benefit from different layouts of features on a sample (e.g., different overlay target designs) and/or different configurations of an overlay metrology tool (e.g., different illumination and/or collection conditions). These techniques may provide different tradeoffs between measurement accuracy, measurement sensitivity, robustness of a measurement to process variations, systematic errors, measurement speed (e.g., measurement throughput), or required space on a sample (e.g., a required target size, a required number or distribution of targets on a sample, or the like). As a result, different overlay metrology techniques implemented at a particular location of a sample may provide different results and/or may produce results with different qualities.

For example, field-plane imaging techniques may determine overlay measurements based on relative imaged positions of non-overlapping features from different patterning processes. Such features may be non-periodic or periodic. Non-limiting examples of associated overlay targets include a box-in-box target, an advanced imaging metrology (AIM) target, or a triple AIM (t-AIM) target. As another example, scatterometry overlay (SCOL) techniques may generate overlay measurements based on pupil-plane and/or field-plane images of overlapping features from different patterning processes. In some cases, the non-overlapping features are formed as overlapping periodic features and may be characterized as grating-over-grating features. Further, such overlapping periodic features may have the same or different pitches. Non-limiting examples of associated overlay targets include a grating-over-grating target, a Moiré target, or a robust AIM target.

It is contemplated herein that a mosaic overlay target may enable multiple overlay measurements based on different overlay techniques or variations thereof. For example, different cell sets may have different designs or different variations of a similar design.

In some embodiments, a mosaic overlay target is designed to enable overlay measurements along two or more measurement directions, some of which may be, but are not required to be, orthogonal. For example, the mosaic target may be designed to have features in a first group of one or more cell sets that are suitable for an overlay measurement along a first measurement direction and may further be designed to have features in a second group of one or more cell sets that are suitable for an overlay measurement along a second measurement direction. As another example, the mosaic target may be designed to have features in one or more cell sets that are suitable for simultaneous overlay measurements along two or more measurement directions.

In some embodiments, a mosaic overlay target is designed to enable measurements between different combinations of layers. For example, the mosaic overlay target may include three or more cell sets, each having features in different layers. In this way, overlay measurements between different combinations of layers may be generated based on different combinations of the associated cell sets.

In some embodiments, a mosaic overlay target is designed to enable alternative overlay measurements. As used herein, the term alternative overlay measurements is used to refer to multiple measurements of a particular quantity such as, but not limited to, an overlay measurement between two particular sample layers along a particular measurement direction. For example, alternative measurements may be based on different features or sets of features within a mosaic overlay target as disclosed herein. It is contemplated herein that such alternative overlay measurements may exhibit different performance characteristics such as, but not limited to, sensitivity to overlay, measurement accuracy, or robustness to printing errors unrelated to overlay. A mosaic overlay target designed to provide alternative overlay measurements may thus promote flexibility and high performance (e.g., as measured by any suitable performance metric) in the overlay metrology process.

It is further contemplated herein that alternative overlay measurements from a mosaic overlay target may be utilized in various ways.

For example, an overlay metrology tool may capture one or more images of various mosaic overlay targets distributed across a sample with a common set of illumination and collection conditions (e.g., associated with a metrology recipe). The overlay metrology tool may then select a particular one of the alternative overlay measurements for each of the mosaic overlay targets based on the associated performance metrics. Since the performance metrics may vary across the sample, different selections from the alternative overlay measurements may be used for different mosaic overlay targets.

As another example, a mosaic overlay target may enable fine-tuning of a metrology recipe without the need for switching between different target designs. A metrology recipe may generally include a set of parameters associated with an overlay target design, illumination conditions of an overlay target, and/or collection conditions for imaging the overlay target. In this way, the metrology recipe may specify conditions suitable for obtaining one or more images of the overlay target that are suitable for an overlay measurement. A metrology recipe may further include one or more analysis steps for generating a value of an overlay measurement based on the one or more images. It is contemplated herein that it may be desirable to adjust one or more aspects of a metrology recipe across a sample and/or between samples in a lot in response to variations of a manufacturing process. It is further contemplated herein that a mosaic overlay target as disclosed herein may include different cell sets with variations of sample features to enable multiple simultaneous metrology recipe variations. Further, capturing additional images of the mosaic overlay target with different illumination and/or collection conditions (e.g., metrology recipe parameters) may enable additional fine tuning of the metrology recipe.

Additional embodiments of the present disclosure are directed to methods for designing a mosaic overlay target. For example, designing a mosaic overlay target may include selecting layouts of target features in two or more cell sets suitable for providing two or more different simultaneous overlay measurements based on one or more images of the mosaic overlay target.

Additional embodiments of the present disclosure are directed to an overlay metrology system suitable for imaging a mosaic overlay target and generating two more overlay measurements based on the images.

In some embodiments, an overlay metrology system is configured to illuminate a mosaic overlay target with off-axis illumination (e.g., oblique illumination with non-normal incidence angles). Off-axis illumination may be well suited for, but is not limited to, reducing a pitch of periodic features that may be resolved and/or reducing a cell size. A diffraction angle from periodic features may be related to both the wavelength of illumination and the pitch of the periodic features, where decreasing the pitch increases the diffraction angle. Off-axis illumination may thus enable the capture of diffraction from smaller pitches than normal illumination. As a non-limiting illustration, off-axis illumination may enable the capture of diffraction from pitches smaller than 600 nm using illumination with visible wavelengths.

In some embodiments, an overlay metrology system illuminates a mosaic overlay target with two or more off-axis illumination beams (e.g., a dipole distribution, a quadrupole distribution, or the like). Such illumination may be generated simultaneously or sequentially (e.g., producing multiple sequential images that may be combined for an overlay measurement). In some embodiments, the illumination beams are arranged in a Littrow condition such that a distance between the poles corresponds to A/pitch, where A is a wavelength of illumination. Littrow illumination may provide particularly robust measurements.

In some embodiments, an overlay metrology system illuminates a mosaic overlay target with a quadrupole distribution of illumination beams formed as two dipoles oriented along orthogonal directions, where the two dipoles have different properties (e.g., different polarizations, different spectral properties, or the like). The overlay metrology system may further include various components in a collection pathway (e.g., polarizers, spectral filters, or the like) to isolate the light associated with each dipole into a different collection channel. In this way, optically-isolated overlay measurements along different measurement directions may be generated.

Referring now to FIGS. 1A-7, systems and methods for overlay metrology using mosaic overlay targets are described in greater detail, in accordance with one or more embodiments of the present disclosure.

FIG. 1A is a conceptual view illustrating an overlay metrology system 100, in accordance with one or more embodiments of the present disclosure. In some embodiments, the overlay metrology system 100 may be characterized as an overlay metrology tool.

In some embodiments, the overlay metrology system 100 includes an overlay metrology sub-system 102 to acquire overlay signals from overlay targets based on any number of metrology recipes. For example, the overlay metrology sub-system 102 may direct illumination 104 to a mosaic overlay target 106 on a sample 108, collect light or other radiation emanating from the mosaic overlay target 106 (referred to herein as sample light 110), and generate one or more images of the mosaic overlay target 106 using one or more detectors 112. The images may include one or more field-plane images from a detector 112 located at a field plane conjugate to the sample 108 (or at least one layer therein) and/or one or more pupil-plane images from a detector 112 located at a pupil plane (e.g., a diffraction plane) associated with an angular distribution of light emanating from the mosaic overlay target 106.

The overlay metrology sub-system 102 may further generate two or more measurements based on the one or more images of the mosaic overlay target 106. For example, the overlay metrology sub-system 102 may generate different overlay measurements based on portions of the one or more images associated with different cell sets of the mosaic overlay target 106.

In some embodiments, the overlay metrology system 100 includes a controller 114. The controller 114 may include one or more processors 116 configured to execute program instructions maintained on memory 118, or a memory medium. In this regard, the one or more processors 116 of controller 114 may execute any of the various process steps described throughout the present disclosure. Further, the controller 114 may be communicatively coupled to the overlay metrology sub-system 102 or any component therein.

The one or more processors 116 of a controller 114 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 116 may include any device configured to execute algorithms and/or instructions (e.g., program instructions stored in memory 118). In some embodiments, the one or more processors 116 may be embodied as a desktop computer, mainframe computer system, workstation, image computer, parallel processor, networked computer, or any other computer system configured to execute a program configured to operate or operate in conjunction with the overlay metrology system 100, as described throughout the present disclosure.

Moreover, different subsystems of the overlay metrology system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller 114 or, alternatively, multiple controllers. Additionally, the controller 114 may include one or more controllers housed in a common housing or within multiple housings. In this way, any controller or combination of controllers may be separately packaged as a module suitable for integration into the overlay metrology system 100.

The memory 118 may include any storage medium known in the art suitable for storing program instructions executable by the associated one or more processors 116. For example, the memory 118 may include a non-transitory memory medium. By way of another example, the memory 118 may include, but is not limited to, a read-only memory (ROM), a random-access memory (RAM), a magnetic or optical memory device (e.g., disk), a magnetic tape, a solid-state drive and the like. It is further noted that memory 118 may be housed in a common controller housing with the one or more processors 116. In some embodiments, the memory 118 may be located remotely with respect to the physical location of the one or more processors 116 and controller 114. For instance, the one or more processors 116 of the controller 114 may access a remote memory (e.g., server), accessible through a network (e.g., internet, intranet and the like).

Further, the overlay tool may be configurable to generate overlay signals (e.g., using the controller 114) based on any number of metrology recipes defining conditions for generating one or more images of a mosaic overlay target 106 suitable for two or more overlay measurements. For example, a metrology recipe may include design parameters of the mosaic overlay target 106, or cell sets thereof, such as, but not limited to, a distribution of target features, a pitch of target features, dimensions of target features (e.g., widths, sidewall angles, or the like), orientations of target features, or a sample height during a measurement (e.g., a working distance between the sample 108 and the overlay metrology sub-system 102). As another example, a metrology recipe may include illumination parameters (e.g., properties of the illumination 104) such as, but not limited to, spectrum, polarization, illumination angle (e.g., in altitude and/or azimuth directions), or illumination field size (e.g., a spot size of the illumination 104). As another example, a metrology recipe may include collection parameters associated with light used to image the mosaic overlay target 106 (e.g., a portion of the sample light 110) such as, but not limited to, a spectrum, a polarization, a collection angle (e.g., in altitude and/or azimuth directions), or collection field size. As another example, a metrology recipe may include parameters associated with one or more detectors 112 used to generate one or more images of the mosaic overlay target 106 such as, but not limited to, gain settings or measurement timing settings. As another example, a metrology recipe may include one or more steps to generate at least two overlay measurements based on one or more images of the mosaic overlay target 106. Such steps may be, but are not required to be, carried out by the controller 114. As an illustration, some overlay techniques may generate an overlay measurement by determining centers of symmetry of non-overlapping features associated with different patterning processes in one or more field-plane images and determining an overlay measurement based on relative positions of these centers of symmetry. As another illustration, some overlay techniques may generate an overlay measurement based on interference patterns of overlapping features associated with different patterning processes captured using field-plane and/or pupil-plane images.

Figure 2A:
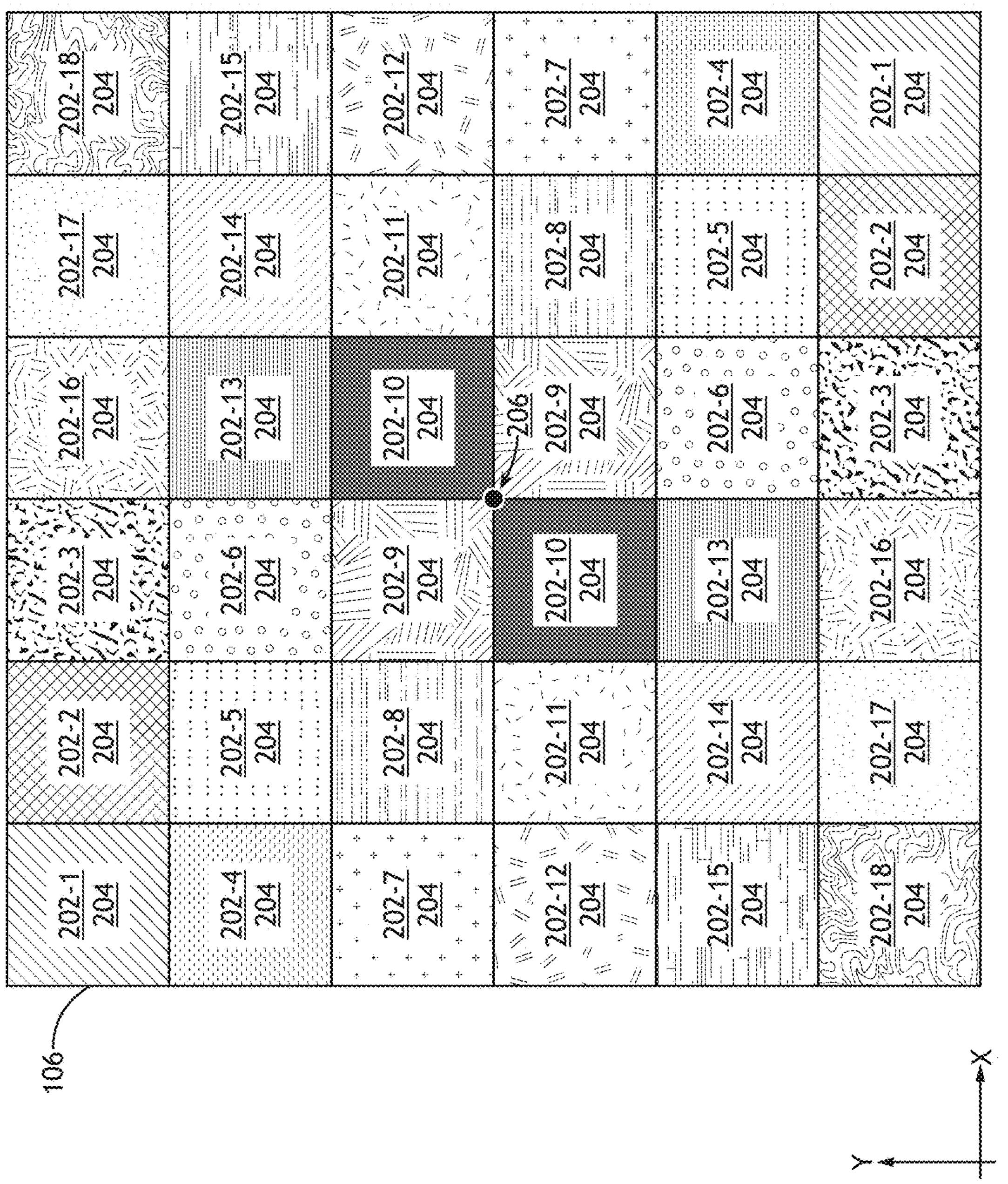
FIG. 2A is a simplified top view of a first design of a mosaic overlay target, in accordance with one or more embodiments of the present disclosure.
Figure 2B:
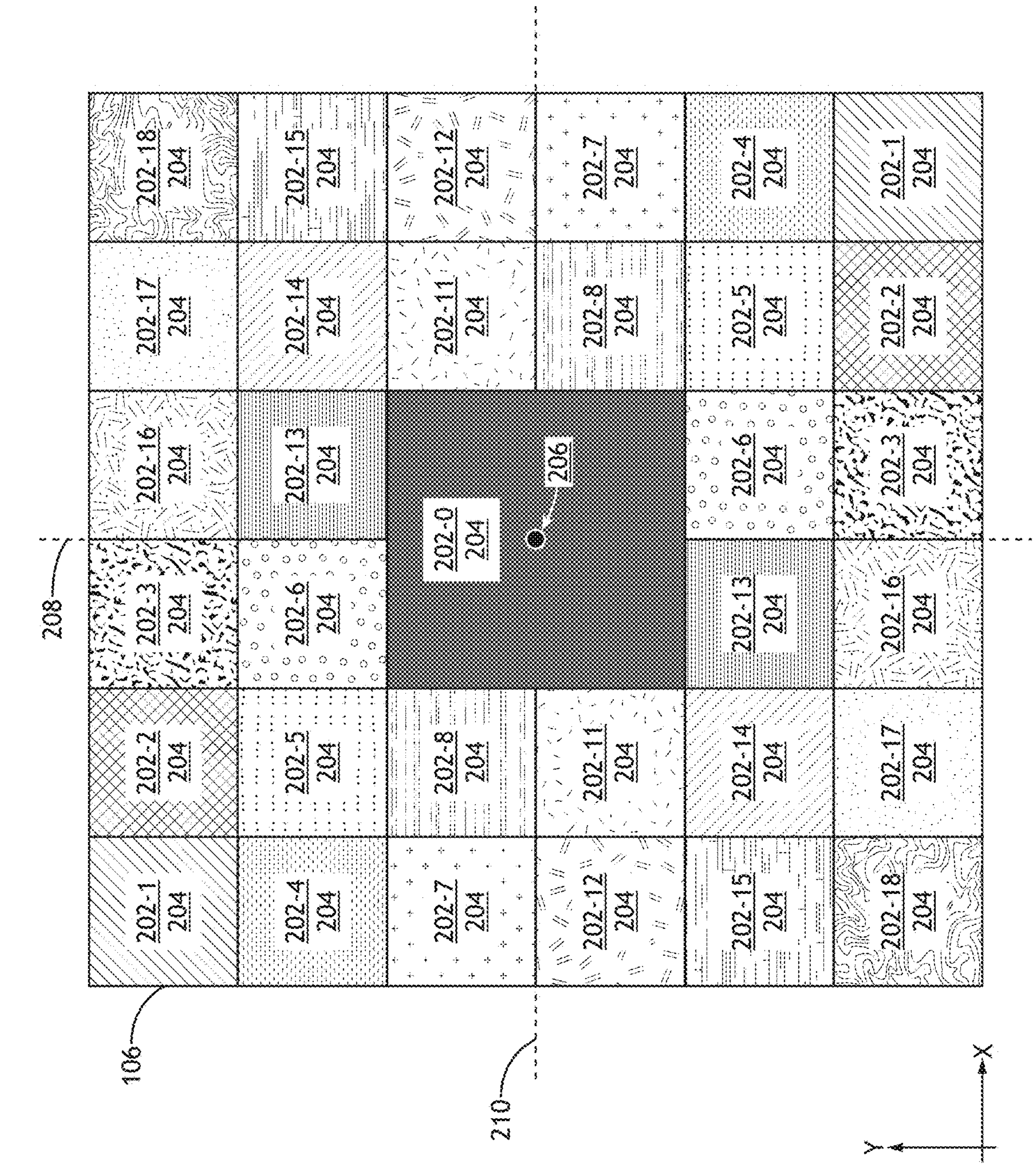
FIG. 2B is a simplified top view of a second design of a mosaic overlay target, in accordance with one or more embodiments of the present disclosure.

Referring now to FIGS. 2A-2B, a mosaic overlay target 106 is described in greater detail, in accordance with one or more embodiments of the present disclosure.

In some embodiments, the mosaic overlay target 106 includes two or more cell sets 202 spatially distributed across the mosaic overlay target 106, where each cell set 202 includes one or more cells 204. Further, each cell 204 may include target features (herein referred to simply as features) associated with one or more patterning processes. It is noted that target features are not illustrated in FIGS. 2A-2B for clarity. Rather, cells 204 are depicted with hatch patterns to illustrate the associated regions of the mosaic overlay target 106.

FIG. 2A is a simplified top view of a first design of a mosaic overlay target 106, in accordance with one or more embodiments of the present disclosure. FIG. 2B is a simplified top view of a second design of a mosaic overlay target 106, in accordance with one or more embodiments of the present disclosure.

In each of FIGS. 2A and 2B, the mosaic overlay target 106 is depicted as a series of cells 204 shown as squares, where cells 204 sharing a common hatch pattern are associated with a common cell set 202. In a general sense, a mosaic overlay target 106 may include two or more cell sets 202, each with one or more cells 204. Further, the cells 204 may generally have any shape and the depicted squares are merely illustrative.

As an illustration, the mosaic overlay target 106 in FIG. 2A includes 18 cell sets 202 (labeled 202-1 through 202-18) that are each formed with two cells 204, which may be referred to as cell pairs. As another illustration, the mosaic overlay target 106 in FIG. 2B includes 16 cell sets 202 (labeled 202-1 through 202-8 and 202-11 through 202-18), each having two cells 204 and a central cell set 202 (labeled 202-0) having a single cell 204. It is to be understood, however, that a cell set 202 is not limited to one or two cells 204 as depicted in FIGS. 2A and 2B and may have three or more cells 204 in some embodiments.

Figure 3:
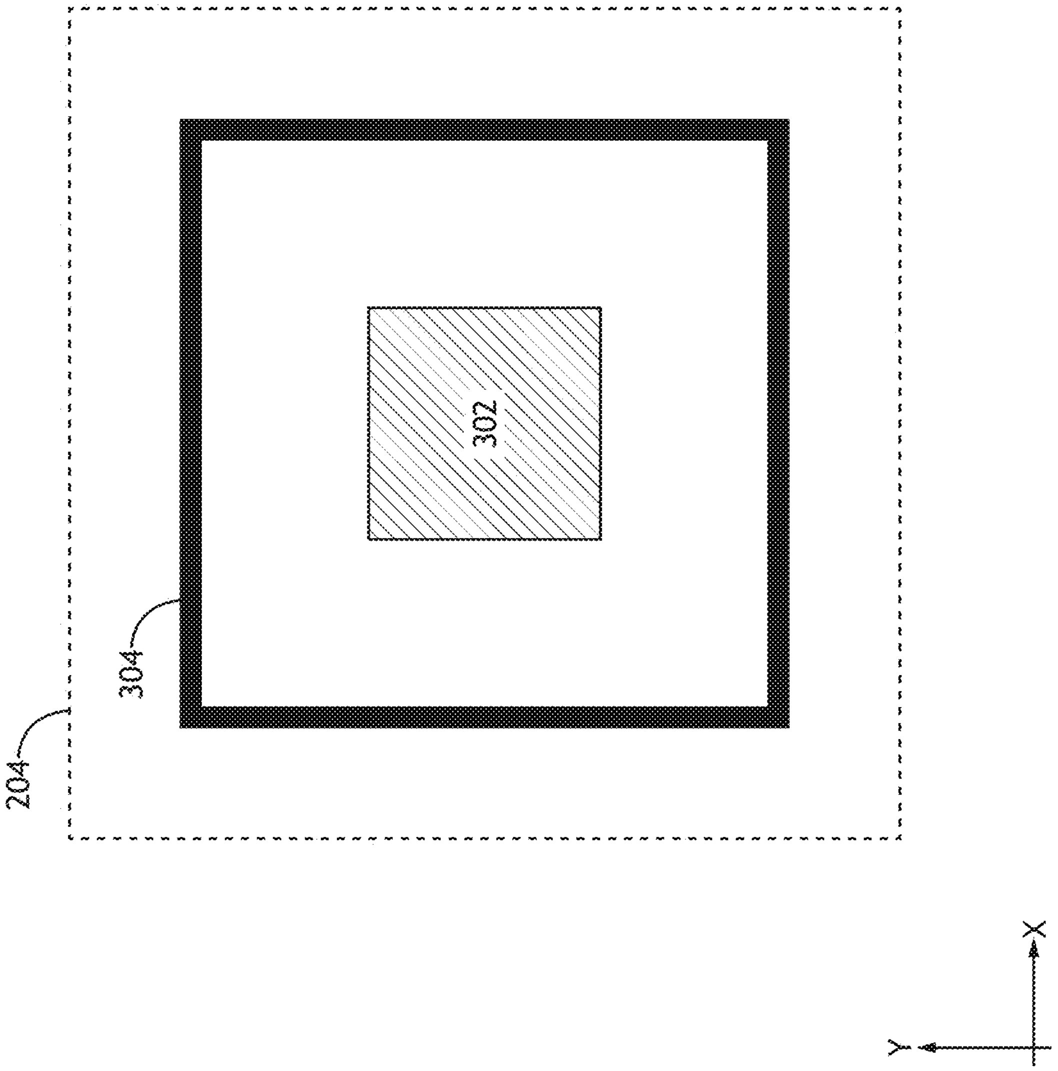
FIG. 3 is a simplified top view of a cell of a mosaic overlay target with box-in-box features, in accordance with one or more embodiments of the present disclosure.
Figure 4A:
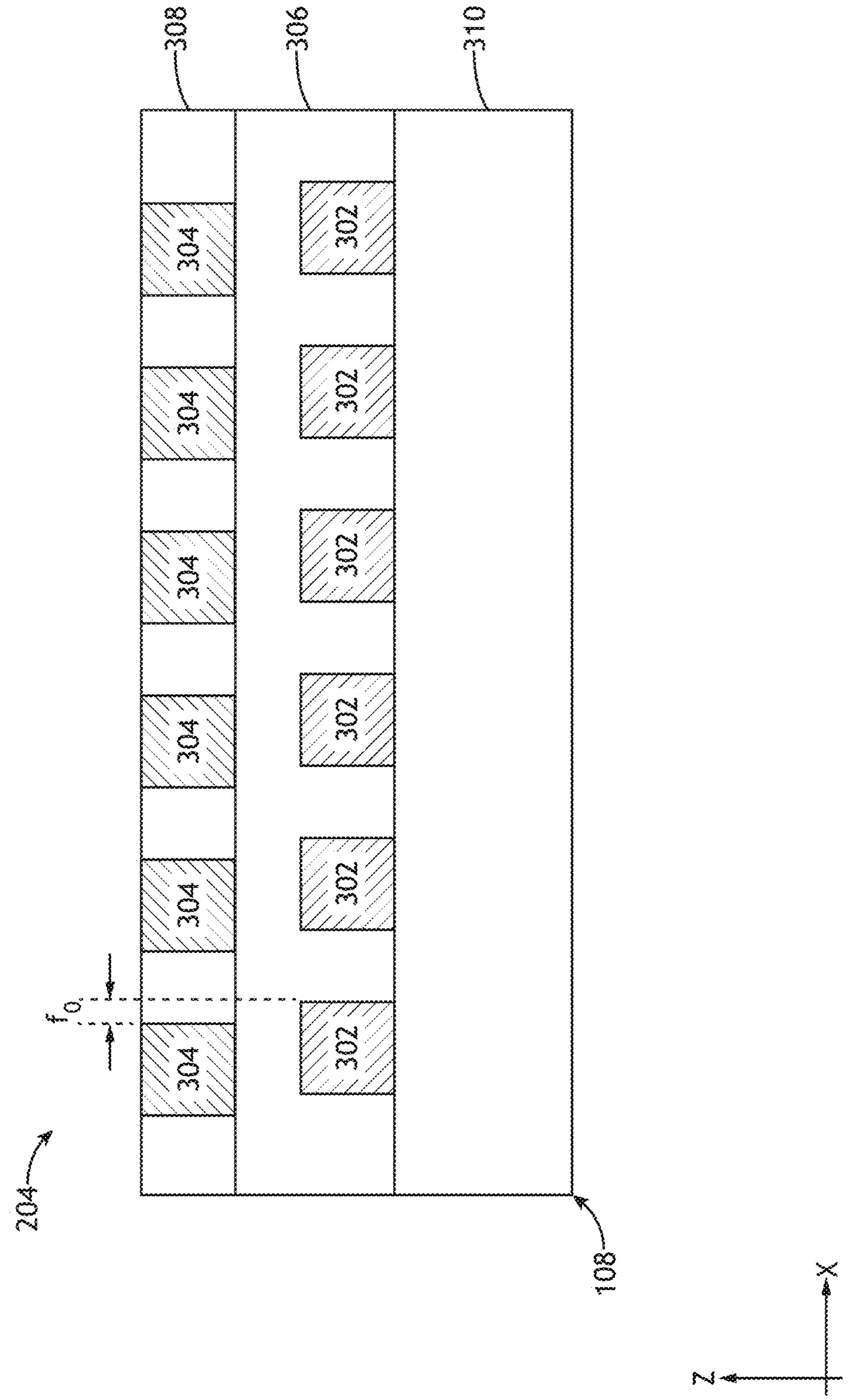
FIG. 4A is a simplified side view of a cell of a mosaic overlay target with overlapping features, in accordance with one or more embodiments of the present disclosure.
Figure 4B:
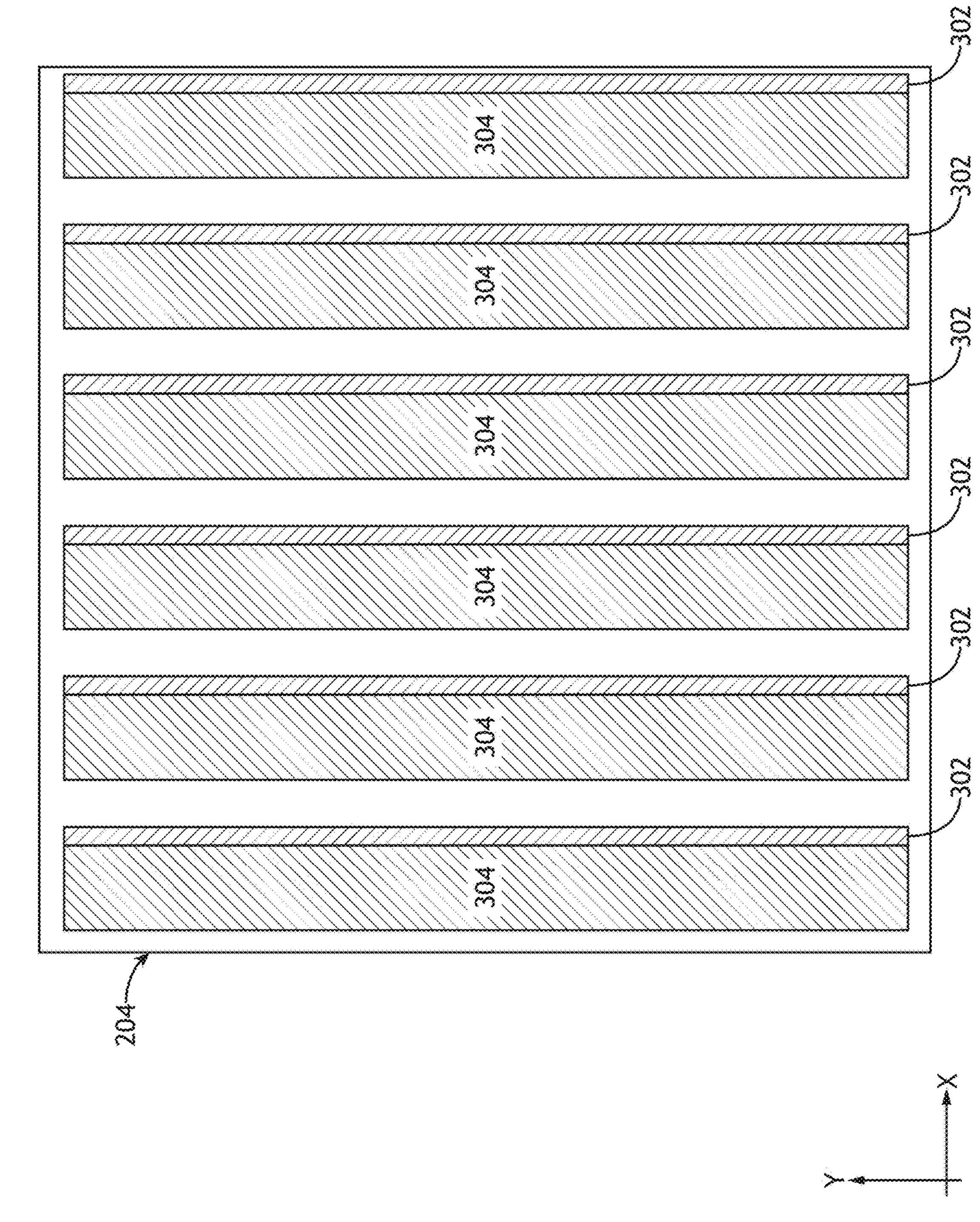
FIG. 4B is a simplified top view of the cell in FIG. 4A, in accordance with one or more embodiments of the present disclosure.
Figure 5:
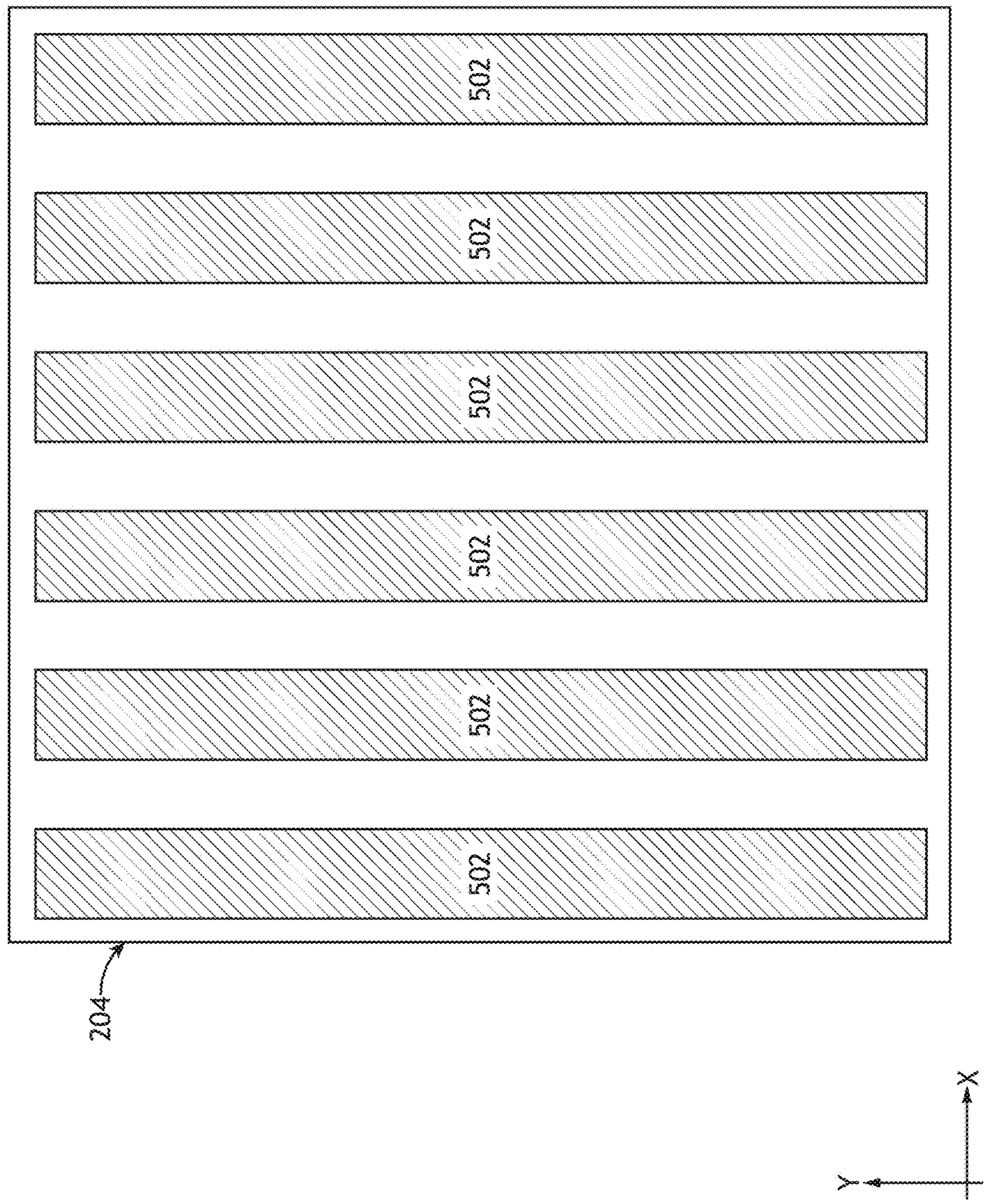
FIG. 5 is a simplified side view of a cell including features associated with a single patterning process on a single layer of a sample, in accordance with one or more embodiments of the present disclosure.

Referring now to FIGS. 3-5, various non-limiting feature layouts are described in accordance with one or more embodiments of the present disclosure. In a general sense, the mosaic overlay target 106 may be designed to facilitate multiple overlay measurements (e.g., two or more overlay measurements), where each overlay measurement is based on one or more cell sets 202. Any cell 204 within any of the cell sets 202 may include features associated with a single patterning process or multiple patterning processes, where the different patterning processes may be on a common layer (e.g., for overlay measurements associated with a multi-patterning technique) or on different layers (e.g., for overlay measurements between different layers). Different cell sets 202 may include features on different layers or combinations of layers. Further, different cell sets 202 may have different designs and/or layouts of corresponding features. Put another way, there are no requirements placed on the similarities or differences between target features (or cells 204 more generally) in different cell sets 202. As a result, each cell set 202 may have a fully customizable design and different overlay techniques may be used to generate overlay measurements based on features in different cell sets 202.

The features within any particular cell 204 may have any layout suitable for overlay measurements. For example, the features within any cell 204 may be non-periodic or may be periodic (e.g., exhibit distinct spatial frequencies) in one or more directions. It is recognized herein that periodic features may produce discrete diffraction orders, particularly when illuminated by an angularly-limited beam of illumination 104, which may aid in the determination of overlay. For instance, periodic structures may improve a signal to noise ratio associated with images of the features (e.g., of resolved images in a field-plane image or of discrete diffraction orders in a pupil-plane image) and thus improve measurement accuracy relative to non-periodic features.

It is noted that FIGS. 3-5 depict different non-limiting target designs suitable for providing overlay measurements between first features 302 associated with a first patterning process and second features 304 associated with a second patterning process. In particular, FIGS. 3-5 depict non-limiting instances in which first features 302 are located on a first layer 306 of a sample 108 and second features 304 are located on a second layer 308 of the sample 108. The illustrated examples may thus be suitable for the determination of overlay between layers of the sample 108. However, it is to be understood that this these depictions are purely for illustrative purposes and not limiting on the present disclosure. For example, it is noted that that the sample 108 may include any number of layers on a substrate 310 and may in some embodiments include additional layers above, below, and/or between the first layer 306 and the second layer 308.

FIG. 3 depicts a non-limiting configuration of a cell 204 including box-in-box features associated with two patterning processes on two layers of a sample 108. FIG. 3 is a simplified top view of a cell 204 of a mosaic overlay target 106 with box-in-box features, in accordance with one or more embodiments of the present disclosure. As an illustration, such a cell 204 may be associated with the central cell set 202-0 in FIG. 2B. Further, the overlay measurement may be generated based on this single cell 204.

As depicted in FIG. 3, the first features 302 may correspond to a central box and the second features 304 may correspond to an outer frame, where the first features 302 and the second features 304 do not overlap. In this way, an overlay measurement between the first and second exposures may be determined based on relative positions of the first features 302 and the second features 304 (e.g., as observable in a field-plane image of the mosaic overlay target 106). For example, the first features 302 may be centered within the second features 304 in the X and/or Y directions when no overlay error is present such that any deviations from this configuration may be attributed to overlay error in the X and/or Y directions.

FIGS. 4A-4B depict a non-limiting configuration of a cell 204 including overlapping features associated with two patterning processes on two layers of a sample 108. FIG. 4A is a simplified side view of a cell 204 of a mosaic overlay target 106 with overlapping features, in accordance with one or more embodiments of the present disclosure. FIG. 4B is a simplified top view of the cell 204 in FIG. 4A, in accordance with one or more embodiments of the present disclosure. As an illustration, such a cell 204 may be suitable for any of the cell sets 202 in FIGS. 2A-2B.

As depicted in FIGS. 4A-4B, the first features 302 may include a first set of periodic features and the second features 304 may correspond to second set of periodic features. Such a configuration may be referred to as a grating-over-grating structure and may generate diffraction orders associated with the first features 302 and second features 304 alone or in combination (e.g., double diffraction). In some embodiments, the first features 302 and the second features 304 have a common pitch (or periodicity more generally) as depicted in FIGS. 4A-4B such that diffraction orders from the first features 302 and second features 304 overlap and interfere. In some embodiments, though not shown, the first features 302 and the second features 304 have different pitches (or periodicities more generally). Such a configuration may also be referred to as a Moiré structure. In this configuration, diffraction orders from the first features 302 and the second features 304 may have different angles and may partially overlap, though this is not a requirement. Such a structure may additionally generate Moiré diffraction (e.g., double diffraction) at different angles based on a difference between the pitches of the first features 302 and the second features 304.

The first features 302 and/or the second features 304 may generally have any periodic distribution along one or more directions and may thus be suitable for facilitating overlay measurements along one or more directions. For example, the first features 302 and/or the second features 304 may include a line/space pattern having any pitch or duty cycle along any direction. Further, any of the first features 302 or the second features 304 may be arranged with two or more characteristic pitches. As an illustration, any of the features may be segmented with a coarse pitch and a fine pitch.

The first features 302 and the second features 304 of any particular cell 204 may be, but are not required to be, intentionally offset along one or more measurement directions. For example, FIGS. 4A-4B illustrate a configuration with an intended offset of $f_0$. In some embodiments, the induced shift is at least an order of magnitude smaller than a size of the cell 204 (e.g., a length of the cell 204 in a direction of the intended offset).

It is contemplated herein that a mosaic overlay target 106 including at least some cell sets 202 including grating-over-grating structures may facilitate overlay measurements using a wide variety of techniques. Overlay measurements using grating-over-grating structures are generally described in U.S. Pat. No. 7,277,172 issued on Oct. 2, 2007; U.S. Pat. No. 7,616,313 issued on Nov. 11, 2009; U.S. Pat. No. 8,004,679 issued on Aug. 23, 2011; U.S. Pat. No. 7,884,936 issued on Feb. 8, 2011; U.S. Pat. No. 8,848,186 issued on Sep. 30, 2014; and U.S. Pat. No. 9,739,702 issued on Aug. 22, 2017; all of which are incorporated herein by reference in their entireties. For example, a zero-order SCOL technique may be based on four cell sets 202 including grating-over-grating structures having common periodicities but different intended offsets (e.g., $\pm f_{0,1}$ and $+f_{0,2}$). As another example, a first-order SCOL technique may be based on two cell sets 202 including grating-over-grating structures having common periodicities but different intended offsets (e.g., $+f_0$). As another example, a Moiré technique may utilize a first cell set 202 including one or more cells 204 in which first features 302 have a first pitch (P) and second features 304 have a second pitch (Q) as well as a second cell set 202 including one or more cells 204 in which first features 302 have the second pitch (Q) and second features 304 have the first pitch (P). In this configuration, an overlay error may induce shifts of Moiré diffraction along opposite directions to facilitate a self-calibrating and self-referencing overlay measurement. It is to be understood that these examples are merely illustrative and should not be interpreted as limiting on the present disclosure. In any of these configurations, a mosaic overlay target 106 may substantially increase the measurement efficiency (e.g., throughput). Unlike existing SCOL techniques in which separate cells 204 with different intended offsets ($f_0$) are separately measured, a mosaic overlay target 106 may enable the simultaneous measurement of cells 204 or cell sets 202 with different intended offsets ($t_0$) for increased throughput. Further, different cell sets 202 with different variations of intended offsets ($f_0$), pitches, or the like may be provided on the same mosaic overlay target 106 such that alternative measurements with different parameters may be generated based on one or more measurements (e.g., field-plane images, pupil-plane images, or the like) of the mosaic overlay target 106.

FIG. 5 is a simplified side view of a cell 204 including features 502 associated with a single patterning process on a single layer of a sample 108 (e.g., the first layer 306 or the second layer 308), in accordance with one or more embodiments of the present disclosure. As an illustration, such a cell 204 may be suitable for any of the cell sets 202 in FIGS. 2A-2B.

It is contemplated herein that an overlay measurement may be generated based on two or more cell sets 202 similar to that depicted in FIG. 5, each having features associated with different patterning processes. For example, a first cell set 202 having features associated with a first patterning process and a second cell set 202 having features associated with a second patterning process may operate as an advanced imaging metrology (AIM) target such that an overlay measurement associated with the first and second patterning processes may be generated using any suitable overlay technique. However, it is noted that such first and second cell sets 202 may be distributed at any location across a mosaic overlay target 106. This approach may be extended to generate overlay measurements between more than two patterning processes on the same or different layers. For example, first cell set 202 having features associated with a first patterning process, a second cell set 202 having features associated with a second patterning process, and a third cell set 202 having features associated with a third patterning process may operate as a triple AIM (t-AIM) target such that an overlay measurement associated with the first and second patterning processes may be generated using any suitable overlay technique.

Referring again generally to FIGS. 2A-2B, additional considerations for designing a mosaic overlay target 106 are described in greater detail, in accordance with one or more embodiments of the present disclosure.

In some embodiments, at least some of the cell sets 202 are designed to have mirror symmetry with respect to a central axis and/or rotational symmetry (e.g., rotational invariance) with respect to a central point. Such symmetry may be beneficial for mitigating certain sources of noise or error in a measurement such as, but not limited to, tool-induced shift (TIS). In the case of rotational symmetry, such a cell set 202 may be invariant to rotation at any angle such as, but not limited to, 90 degrees (e.g., 90-degree rotational symmetry) or 180 degrees (e.g., 180-degree rotational symmetry). It is noted that such symmetry may refer to the distribution of target features in a cell set 202 (or cells 204 therein) across the mosaic overlay target 106 as well as the shapes and orientations of the associated cells 204. For example, cells 204 within a cell set 202 at symmetric locations may have a common size to provide the desired symmetry across the mosaic overlay target 106.

As an illustration, the cell pairs in the cell sets 202-1 through 202-18 in FIG. 2A and cell sets 202-1 through 202-8 and 202-11 through 202-18 in FIG. 2B are distributed with 180-degree rotational symmetry around a central point 206. As another illustration, the cell set 202-0 with a single cell 204 may exhibit mirror symmetry along a vertical central axis 208 or a horizontal central axis 210. As another illustration, the cell set 202-0 with a single cell 204 may exhibit rotational symmetry (e.g., 90-degree or 180-degree rotational symmetry) with respect to the central point 206. It is noted that although FIGS. 2A and 2B depict only the locations and shapes of the cells 204, the target features within the cells 204 of any particular cell set 202 may be arranged such that the cell set 202 has the desired symmetry.

In some embodiments, one or more cell sets 202 are designed to share a common center of symmetry with the mosaic overlay target 106 as a whole (or with other cell sets 202) under certain conditions such as, but not limited to, a zero overlay condition (e.g., a condition in which features associated with the different cell sets 202 are printed without unintentional overlay errors). Continuing the illustration of FIGS. 2A and 2B, all of the cell sets 202-0 through 202-18 may be 180-degree rotationally symmetric with respect to the central point 206. However, as described previously herein, features within a cell set 202 may be printed with intentional (e.g., designed) overlay offsets, which may shift the associated center of symmetry of the cell set 202.

The ability of a mosaic overlay target 106 to facilitate multiple simultaneous metrology measurements will now be described in greater detail, in accordance with one or more embodiments of the present disclosure.

A mosaic overlay target 106 may be designed to facilitate two or more simultaneous metrology measurements, where each measurement is based on one or more images of the mosaic overlay target 106 (e.g., one or more field-plane images and/or one or more pupil-plane images). For example, a first metrology measurement may be generated based on a first group of one or more cell sets 202, a second metrology measurement may be generated based on a second group of one or more cell sets 202, and so on. In this example, the first, second, and third sets of cell sets 202 include unique combinations of cell sets 202 from the mosaic overlay target 106. However, in some embodiments, some cell sets 202 may be included in multiple sets of cell sets 202 and may thus be utilized in different ways for the generation of multiple metrology measurements.

It is contemplated herein that a mosaic overlay target 106 may provide substantial flexibility and efficiency in metrology applications. For example, a mosaic overlay target 106 may enable simultaneous overlay measurements between many sample layers and/or simultaneous alternative metrology measurements of a common aspect of the sample 108 (e.g., based on different measurement techniques and/or different feature geometries).

A mosaic overlay target 106 may be configured to provide simultaneous metrology measurements along multiple measurement directions, which may be, but are not required to be, orthogonal. As an illustration in the context of FIG. 2A, cell sets 202 in the upper left and lower right quadrants (e.g., cell sets 202-1 through 202-9) may be configured to provide metrology measurements along a first direction (e.g., an X direction), whereas cell sets 202 in the upper right and lower left quadrants (e.g., cell sets 202-10 through 202-18) may be configured to provide metrology measurements along a second direction (e.g., a Y direction).

In some embodiments, a mosaic overlay target 106 is configured to provide simultaneous metrology measurements between multiple different patterning processes. For example, a mosaic overlay target 106 may include multiple cell sets 202, each having features associated with different patterning processes. As an illustration based on FIG. 2A, the cell sets 202-1 through 202-9 may each include features suitable for X-direction overlay measurements on different layers of the sample 108. Similarly, cell sets 202-10 through 202-18 may each include features suitable for Y-direction overlay measurements on different layers of the sample 108. For instance, cell set 202-1 may include features on a first layer suitable for X-direction measurements, cell set 202-10 may include features on a first layer suitable for Y-direction measurements, cell set 202-2 may include features on a second layer suitable for X-direction measurements, cell set 202-11 may include features on a second layer suitable for Y-direction measurements, and so on. Further, the features on each cell set 202 may include features such as, but not limited to, those depicted in FIG. 5 oriented along the X or Y directions as appropriate for X or Y direction measurements, respectively. In this configuration, simultaneous overlay measurements between any combination of nine sample layers along two measurement directions may be generated based on one or more images of the mosaic overlay target 106. For instance, such a target may be fabricated with approximately the same dimensions as a traditional AIM target suitable for overlay measurements of two layers or a t-AIM suitable for overlay measurements of three layers. A mosaic overlay target 106 may thus provide a high measurement efficiency (e.g., high throughput). Further, this technique may be extended to any number of sample layers.

In some embodiments, at least some cell sets 202 of a mosaic overlay target 106 are configured to provide alternative measurements of a common parameter of the sample 108 (e.g., an overlay measurement between two particular patterning processes along a particular measurement direction). In this way, a mosaic overlay target 106 may enable robust and flexible measurements.

As described previously herein, any particular cell set 202 or combination of cell sets 202 may be designed to provide a metrology measurement. In some embodiments, a mosaic overlay target 106 may include a first group of cell sets 202 designed to provide a first overlay measurement between two particular patterning processes along a particular measurement direction and at least a second group of cell sets 202 designed to provide at least a second overlay measurement between the same two particular patterning processes along the same particular measurement direction. However, the first and second groups of cell sets 202 may include features with different layouts. As a result, the first and second overlay measurements may be generated using different overlay metrology techniques or variations of the same technique. In either case, the measurement accuracy, measurement sensitivity, and/or the robustness of a measurement to process deviations on the sample 108 may be different for the first and second overlay measurements.

Figure 2C:
FIG. 2C is a top view of a variation of the target of FIG. 2A providing multiple alternative overlay measurements along different measurement directions, in accordance with one or more embodiments of the present disclosure.

As an illustration, FIG. 2C is a top view of a variation of the target of FIG. 2A providing multiple alternative overlay measurements along different measurement directions, in accordance with one or more embodiments of the present disclosure.

In FIG. 2C, cell sets 202 in the upper left and lower right quadrants (e.g., cell sets 202-1 through 202-9) may be configured to provide metrology measurements along a first direction (e.g., an X direction), whereas cell sets 202 in the upper right and lower left quadrants (e.g., cell sets 202-10 through 202-18) may be configured to provide metrology measurements along a second direction (e.g., a Y direction).

Further, the mosaic overlay target 106 of FIG. 2C includes a first group of cell sets 202 (cell sets 202-1, 202-2, 202-4, and 202-5) having features on a first layer 306 (e.g., first features 302) suitable for first-direction measurements, but with different cell designs. For example, the cells 204 within this first group of cell sets 202 may all have periodicity in the first direction, but may have different pitches, feature widths (e.g., duty cycles of a line/space pattern), fine segmentation, or any other differences. Similarly, the mosaic overlay target 106 of FIG. 2C includes a second group of cell sets 202 (cell sets 202-3, 202-6, 202-7, 202-8, and 202-9) having features on a second layer 308 (e.g., second features 304) suitable for first-direction measurements, but with different cell designs.

The mosaic overlay target 106 of FIG. 2C further includes a third group of cell sets 202 (cell sets 202-10, 202-11, 202-13, and 202-14) having features on a first layer 306 (e.g., first features 302) suitable for second-direction measurements, but with different cell designs. For example, the cells 204 within this third group of cell sets 202 may all have periodicity in the second direction, but may have different pitches, feature widths (e.g., duty cycles of a line/space pattern), fine segmentation, or any other differences. The mosaic overlay target 106 of FIG. 2C also includes a fourth group of cell sets 202 (cell sets 202-12, 202-15, 202-16, 202-17, and 202-18) having features on a second layer 308 (e.g., second features 304) suitable for second-direction measurements, but with different cell designs.

In this configuration, an overlay measurement between the first layer 306 and the second layer 308 along the first direction may be generated based on any combination of cell sets 202 from the first group and the second group, while an overlay measurement between the first layer 306 and the second layer 308 along the second direction may be generated based on any combination of cell sets 202 from the third group and the fourth group. In particular, the mosaic overlay target 106 of FIG. 2C may provide 20 combinations of cell sets 202 along each direction and thus provide 20 alternative overlay measurements between the first layer 306 and the second layer 308 along each direction.

It is to be understood, however, that FIC. 2C and the associated description is provided solely for illustrative purposes and should not be interpreted as limiting. For example, a mosaic overlay target 106 may generally include any number of groups of cell sets 202 in any arrangement suitable for any number of alternative overlay measurements. As another example, a mosaic overlay target 106 may provide alternative measurements using any overlay metrology technique and any associated cell design. In this way, a mosaic overlay target 106 may provide alternative measurements using SCOL techniques utilizing grating-over-grating features. In this case, different cell sets 202 may include cells 204 with different intended offsets (f 0) as well as (or instead of) different pitches, feature widths (e.g., duty cycles of a line/space pattern), fine segmentation, or any other differences. As another example, a mosaic overlay target 106 may include one or more groups of cell sets 202 suitable for overlay measurements using a first overlay metrology technique (e.g., a field-plane imaging technique, or the like) and one or more additional groups of cell sets 202 suitable for overlay measurements using a second overlay metrology technique (e.g., a SCOL technique, or the like).

Figure 6:
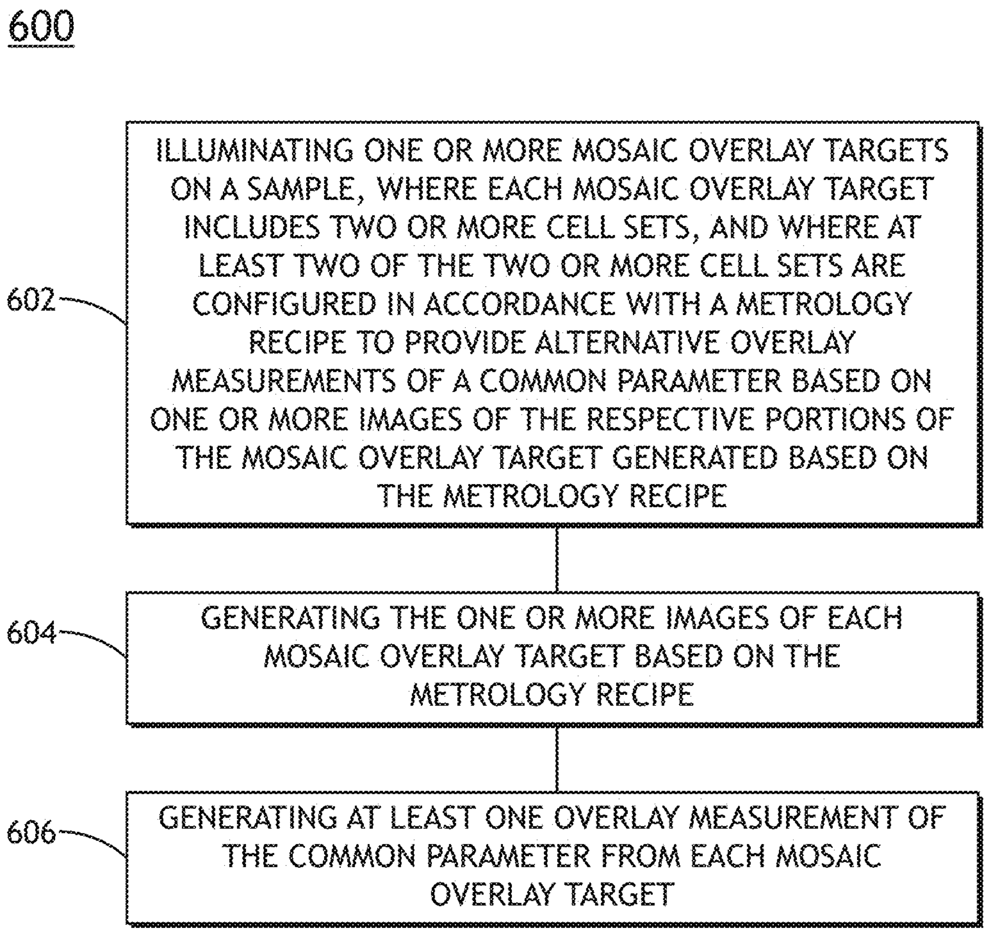
FIG. 6 is a flow diagram illustrating steps performed in a method, in accordance with one or more embodiments of the present disclosure.

Referring now to FIG. 6, methods for overlay metrology providing alternative overlay measurements from a mosaic overlay target 106 are described, in accordance with one or more embodiments of the present disclosure.

FIG. 6 is a flow diagram illustrating steps performed in a method 600, in accordance with one or more embodiments of the present disclosure. Applicant notes that the embodiments and enabling technologies described previously herein in the context of the overlay metrology system 100 should be interpreted to extend to the method 600. It is further noted, however, that the method 600 is not limited to the architecture of the overlay metrology system 100.

In some embodiments, the method 600 includes a step 602 of illuminating one or more mosaic overlay targets 106 on a sample 108, where each mosaic overlay target 106 includes two or more cell sets 202, and where at least two of the two or more cell sets 202 are configured in accordance with a metrology recipe to provide alternative overlay measurements of a common parameter based on one or more images of the respective portions of the mosaic overlay target 106 generated based on the metrology recipe. For example, the common parameter may be overlay between two particular process steps along a particular measurement direction.

In some embodiments, the method 600 includes a step 604 of generating the one or more images of each mosaic overlay target 106 based on the metrology recipe. For example, the metrology recipe may define parameters associated with the illumination of the mosaic overlay target 106 (e.g., spectrum, polarization, incidence angle, or the like), collection of light from the mosaic overlay target 106 for image formation (e.g., spectrum, polarization, collection angle), detector parameters, or any other parameters of an overlay metrology tool that may impact an overlay measurement.

In some embodiments, the method 600 includes a step 606 of generating at least one overlay measurement of the common parameter from each mosaic overlay target 106.

It is contemplated herein that alternative overlay measurements enabled by a mosaic overlay target 106 may be utilized in various ways within the spirit and scope of the present disclosure. As described previously herein, the alternative overlay measurements may provide different accuracy, sensitivity, and/or robustness to process variations based on the particular physical properties of the sample 108 at a particular location of a particular mosaic overlay target 106. Since the alternative overlay measurements may be generated based on a single capture of one or more images of a mosaic overlay target 106 (e.g., based on different portions of the associated images), measurement throughput may be substantially higher than measuring separate targets and the primary cost to generate the alternative overlay measurements are only related to the computational resources needed to process the images.

In some embodiments, the step 606 may include, for at least some of the mosaic overlay targets 106, generating at least some of the alternative overlay measurements enabled by the mosaic overlay target 106. These alternative overlay measurements may then be used individually and/or combined to generate a composite overlay measurement. For example, the step 606 may include combining multiple alternative overlay measurements using any suitable technique (e.g., using averaging, weighted averaging, or any suitable technique) to generate a composite overlay measurement, which may be more accurate, sensitive, and/or robust than any of the individual alternative measurements. Such a composite overlay measurement may be generated for multiple mosaic overlay targets 106 distributed across at least one sample 108 and may this provide accurate and sensitive metrology with relatively high robustness to process variations. Further, the availability of the multiple alternative overlay measurements enables a mitigation of pattern placement error (PPE) or other inaccuracy problems.

In some embodiments, the step 606 may include generating a single one of the alternative overlay measurements for at least some of the mosaic overlay targets 106. For instance, a particular one of the alternative overlay measurements having an accuracy and/or sensitivity above a selected threshold may be generated (or a quality threshold more generally). As an illustration, it may be more computationally efficient to generate a single measurement per mosaic overlay target 106 (or a single measurement per direction per mosaic overlay target 106) based on a selected cell set 202. As another illustration, it may be the case that a process variation the location of a particular mosaic overlay target 106 may render one or more of the alternative overlay measurements inaccurate or invalid. In this case, such alternative measurements can be discarded. As long as at least one measurement based on at least one cell set 202 meets a desired threshold, a valid measurement may be obtained from a particular mosaic overlay target 106. As a result, overall measurement throughput may remain high.

Figure 7:
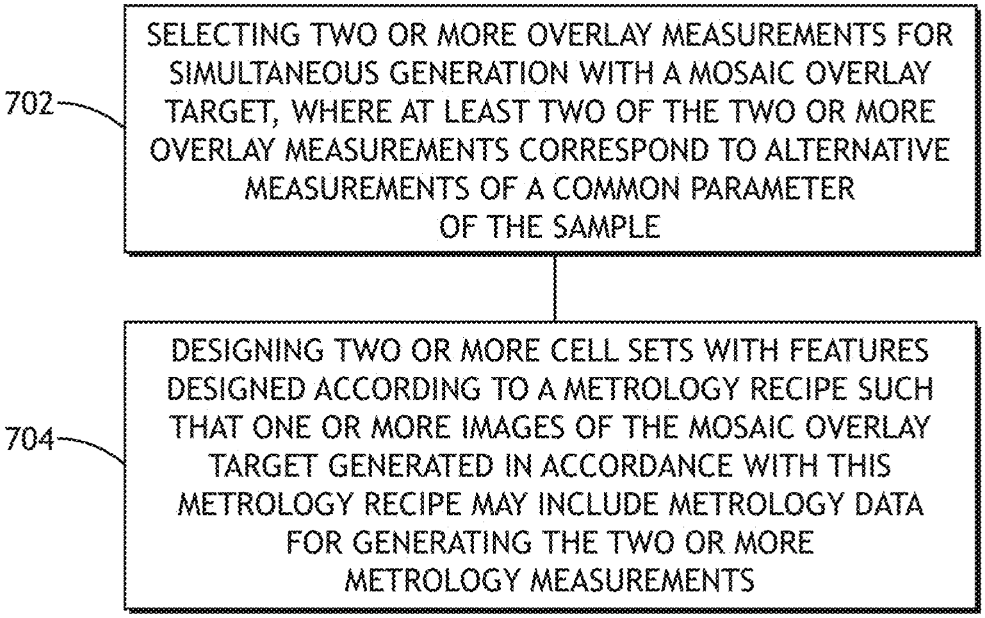
FIG. 7 is a flow diagram illustrating steps performed in a method for designing a mosaic overlay target, in accordance with one or more embodiments of the present disclosure.

Referring now to FIG. 7, FIG. 7 is a flow diagram illustrating steps performed in a method 700 for designing a mosaic overlay target 106, in accordance with one or more embodiments of the present disclosure. Applicant notes that the embodiments and enabling technologies described previously herein in the context of the overlay metrology system 100 should be interpreted to extend to the method 700. It is further noted, however, that the method 700 is not limited to the architecture of the overlay metrology system 100.

It is contemplated herein that it may generally be desirable to provide overlay measurements within a certain tolerance. However, the particular tolerance requirements may be different for different applications and/or may change over time. As an illustration, an overlay tolerance may be characterized as $-N<OVL_1<N$ for one layer and $-M<OVL_2<M$ for another layer. As another illustration, an overlay tolerance may be characterized as —$N<OVL_1<N$ and $-M<2*OVL_1+OVL_2<M$. In a general sense, it may be desirable to determine overlay within a tolerance sufficient to maintain the electrical robustness of the printed features. As the feature size of fabricated features decreases, the overlay measurement tolerances may become increasing complex. For instance, it may become necessary to implement complex requirements between multiple layers and/or develop non-linear requirements associated with relationships between different layers.

It is contemplated herein that a mosaic overlay target 106 as disclosed herein may enable simultaneous or selective overlay measurements based on different cell sets 202 and possibly different measurement techniques or algorithms. In this way, a user may be able to meet various overlay measurement tolerances or considerations.

Further, it may be the case that process variations may change the sensitivity of any particular cell set 202. For example, variations of printed linewidths due to process variations may impact the diffraction efficiency from target features and in turn impact the measurement sensitivity. Accordingly, it may be desirable to design a mosaic overlay target 106 to include different cell sets 202 having different feature characteristics (e.g., feature width, or the like). In this configuration, the various cell sets 202 may be evaluated on the fly based on the particular printing characteristics to provide an overlay measurement within a selected tolerance.

In some embodiments, the method 700 includes a step 702 of selecting two or more overlay measurements for simultaneous generation with a mosaic overlay target 106, where at least two of the two or more overlay measurements correspond to alternative measurements of a common parameter of the sample 108. For example, the two or more overlay measurements may correspond to measurements along two or more directions or measurements between different combinations of patterning processes (e.g., overlay measurements between different combinations of three or more patterning processes on one or more layers). Further, the common parameter may refer to an overlay measurement associated with a particular two patterning processes in a particular direction such that the alternative measurements may generate values of this common parameter using different techniques (e.g., associated with different metrology recipes or variations of a metrology recipe).

In some embodiments, the method 700 includes a step 704 of designing two or more cell sets 202 with features designed according to a metrology recipe such that one or more images of the mosaic overlay target 106 generated in accordance with this metrology recipe may include metrology data for generating the two or more metrology measurements selected in step 702.

Figure 1B:
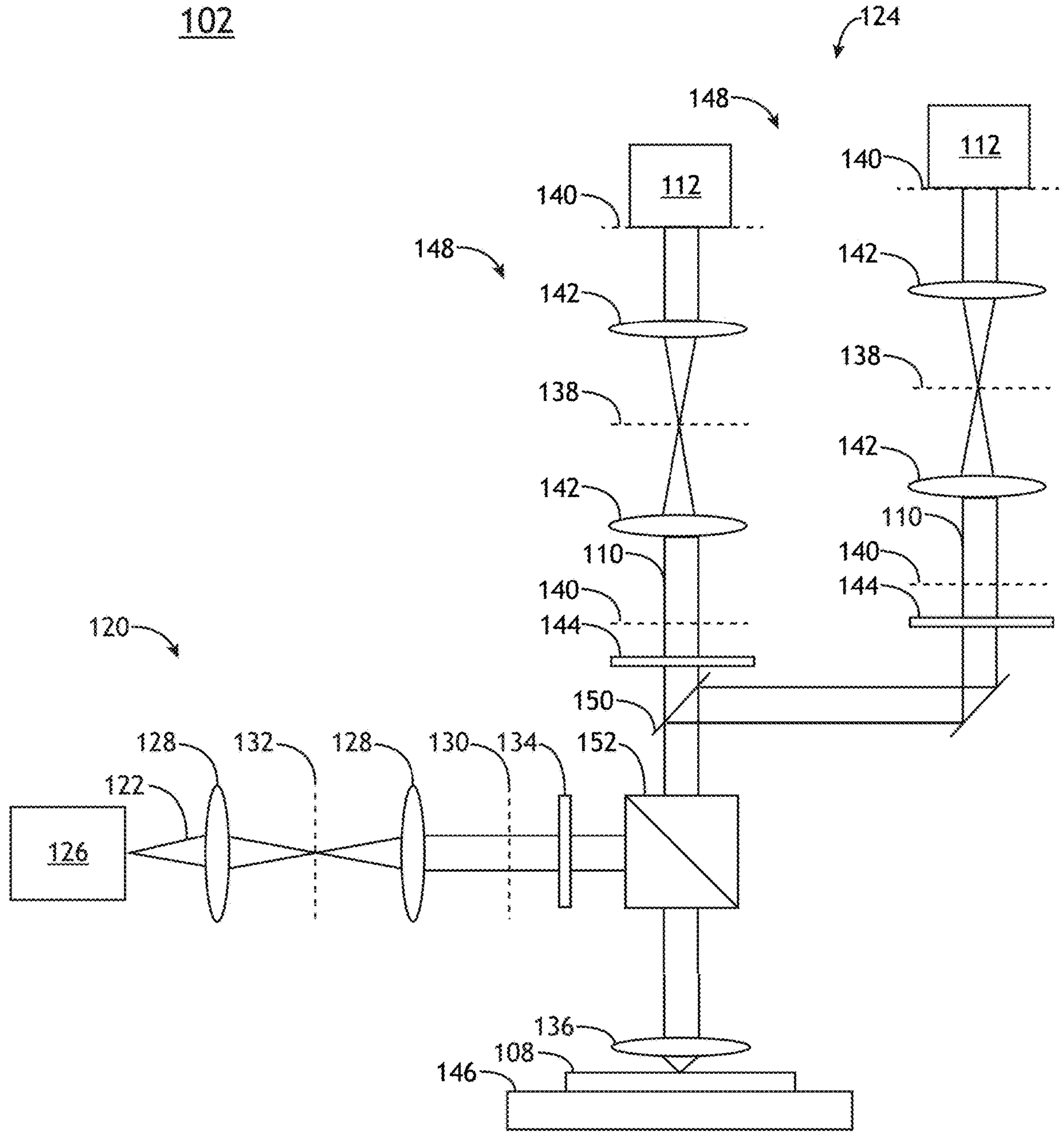
FIG. 1B is a simplified schematic of an overlay metrology sub-system, in accordance with one or more embodiments of the present disclosure.

Referring now to FIG. 1B, various additional aspects of the overlay metrology sub-system 102 are described in greater detail, in accordance with one or more embodiments of the present disclosure.

FIG. 1B is a simplified schematic of an overlay metrology sub-system 102, in accordance with one or more embodiments of the present disclosure.

In some embodiments, the overlay metrology sub-system 102 includes an illumination sub-system 120 to generate illumination in the form of one or more illumination beams 122 to illuminate the sample 108 and a collection sub-system 124 to collect light from the illuminated sample 108 (e.g., sample light 110).

In some embodiments, the illumination sub-system 120 includes an illumination source 126 configured to generate at least one illumination beam 122. The illumination from the illumination source 126 may include one or more selected wavelengths of light including, but not limited to, ultraviolet (UV) radiation, visible radiation, or infrared (IR) radiation. The illumination source 126 may include any type of illumination source suitable for providing at least one illumination beam 122. In some embodiments, the illumination source 126 is a laser source. For example, the illumination source 126 may include, but is not limited to, one or more narrowband laser sources, a broadband laser source, a supercontinuum laser source, a white light laser source, or the like. In this regard, the illumination source 126 may provide an illumination beam 122 having high coherence (e.g., high spatial coherence and/or temporal coherence). In some embodiments, the illumination source 126 includes a laser-sustained plasma (LSP) source. For example, the illumination source 126 may include, but is not limited to, a LSP lamp, a LSP bulb, or a LSP chamber suitable for containing one or more elements that, when excited by a laser source into a plasma state, may emit broadband illumination.

In embodiments with two or more illumination beams 122, these beams may be generated using a variety of techniques. In some embodiments, the illumination sub-system 120 includes two or more apertures at an illumination field plane 132. In some embodiments, the illumination sub-system 120 includes one or more beamsplitters to split illumination from the illumination source 126 into the two or more illumination beams 122. In some embodiments, at least one illumination source 126 generates two or more illumination beams 122 directly. In a general sense, each illumination beam 122 may be considered to be a part of a different illumination channel regardless of the technique in which the various illumination beams 122 are generated.

In some embodiments, the illumination sub-system 120 includes one or more optical components suitable for modifying and/or conditioning the one or more illumination beams 122 as well as directing the one or more illumination beams 122 to the sample 108. For example, the illumination sub-system 120 may include one or more illumination lenses 128 (e.g., to collimate the one or more illumination beams 122, to relay an illumination pupil plane 130 and/or an illumination field plane 132, or the like). In some embodiments, the illumination sub-system 120 includes one or more illumination control optics 134 to shape or otherwise control the one or more illumination beams 122. For example, the illumination control optics 134 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In some embodiments, the overlay metrology sub-system 102 includes an objective lens 136 to focus the one or more illumination beams 122 onto the sample 108 (e.g., an overlay target with overlay target elements located on two or more layers of the sample 108).

In some embodiments, the one or more illumination beams 122 may be angularly limited on the sample 108 such that periodic structures in one or more cells 204 of the mosaic overlay target 106 may generate discrete diffraction orders. Further, the one or more illumination beams 122 may be spatially limited such that they may illuminate selected portions of the sample 108. For instance, each of the one or more illumination beams 122 may be spatially limited to the size of a mosaic overlay target 106. In this way, the one or more illumination beams 122 may fully illuminate (e.g., overfill) the mosaic overlay target 106).

In some embodiments, the collection sub-system 124 includes one or more detectors 112, where any detector 112 may be located at a collection field plane 138 conjugate to the mosaic overlay target 106 or at a collection pupil plane 140 (e.g., a diffraction plane) associated with an angular distribution of the sample light 110.

The collection sub-system 124 may include one or more optical elements suitable for modifying and/or conditioning the sample light 110 from the sample 108. In some embodiments, the collection sub-system 124 includes one or more collection lenses 142 (e.g., to collimate the sample light 110, to relay pupil and/or field planes, or the like), which may include, but are not required to include, the objective lens 136. In some embodiments, the collection sub-system 124 includes one or more collection control optics 144 to shape or otherwise control the sample light 110. For example, the collection control optics 144 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In some embodiments, the overlay metrology sub-system 102 includes a translation stage 146 to position the sample 108 with respect to the objective lens 136 during a measurement.

In some embodiments, the collection sub-system 124 includes two or more collection channels 148, each with at least one detector 112. For example, as illustrated in FIG. 1B, the overlay metrology sub-system 102 may include one or more beamsplitters 150 arranged to split the sample light 110 into the collection channels 148. Further, the beamsplitters 150 may be polarizing beamsplitters, non-polarizing beamsplitters, or a combination thereof.

In some embodiments, as illustrated in FIG. 1B, the overlay metrology sub-system 102 includes a beamsplitter 152 to combine the illumination sub-system 120 and the collection sub-system 124 such that the objective lens 136 may both direct the illumination 104 to the sample 108 and collect sample light 110 from the sample 108.

Figure 1C:
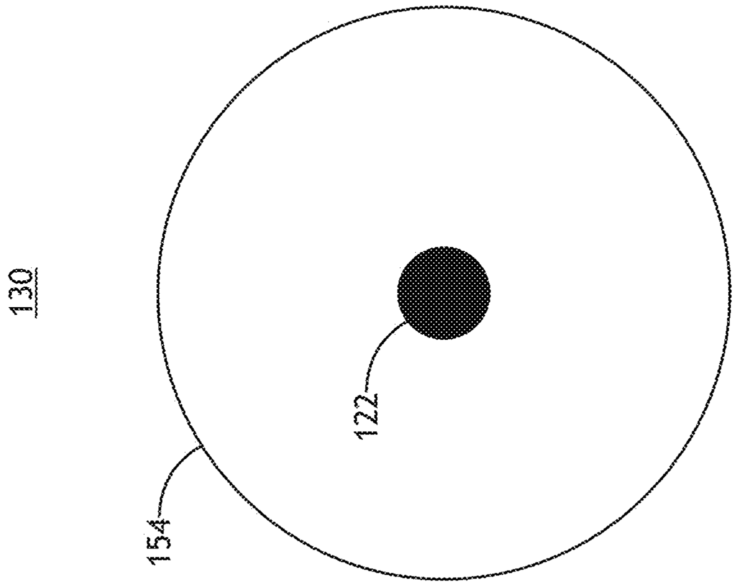
FIG. 1C is a simplified schematic view of a first illumination pupil plane depicting a single illumination beam providing a normal incidence angle, in accordance with one or more embodiments of the present disclosure.
Figure 1D:
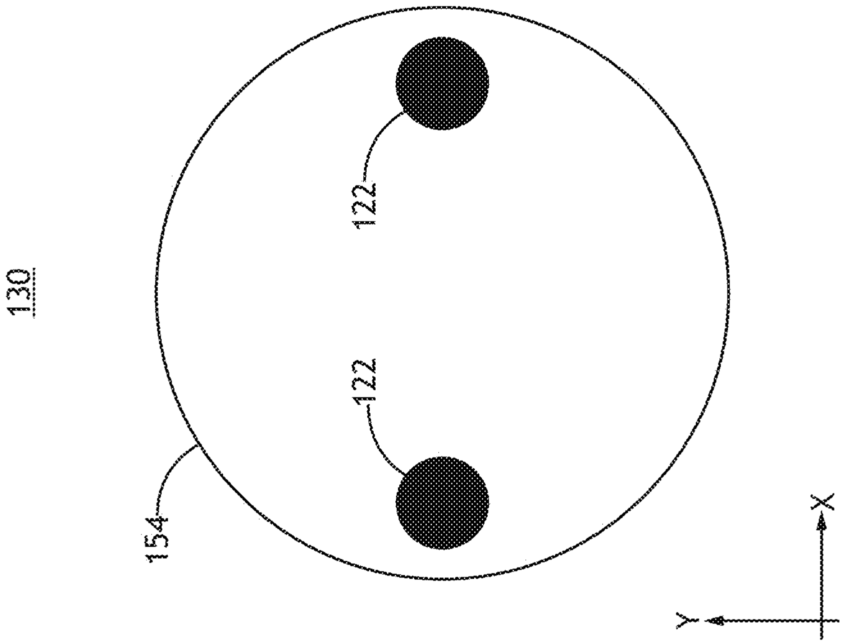
FIG. 1D is a simplified schematic view of a second illumination pupil plane depicting two illumination beams in a dipole configuration, in accordance with one or more embodiments of the present disclosure.
Figure 1E:
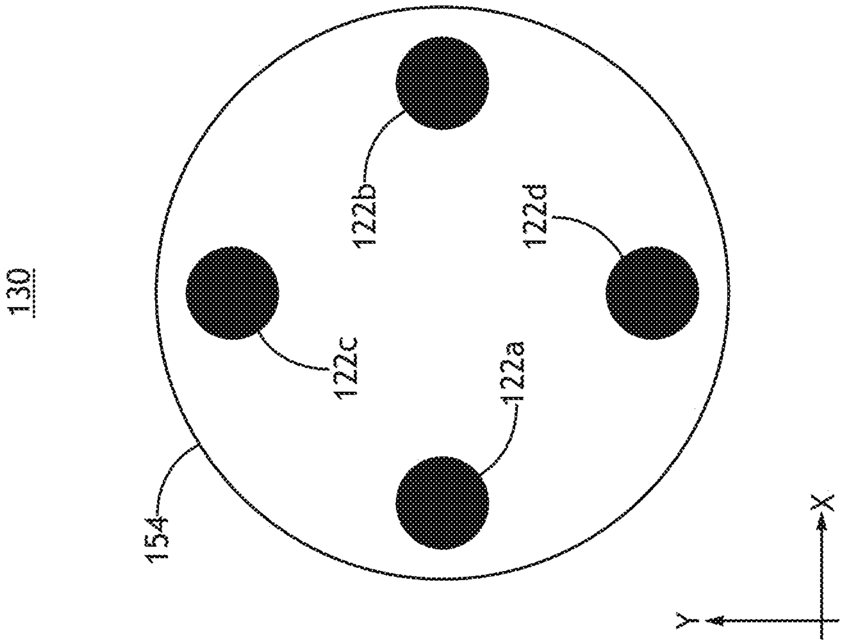
FIG. 1E is a simplified schematic view of a third illumination pupil plane depicting four illumination beams in a quadrupole configuration, in accordance with one or more embodiments of the present disclosure.

Referring now to FIGS. 1C-1E, illumination and collection profiles are described in greater detail, in accordance with one or more embodiments of the present disclosure.

In a general sense, the overlay metrology sub-system 102 may illuminate a mosaic overlay target 106 with any combination of one or more illumination beams 122 in any distribution.

FIG. 1C is a simplified schematic view of a first illumination pupil plane 130 depicting a single illumination beam 122 providing a normal incidence angle, in accordance with one or more embodiments of the present disclosure. For example, the single illumination beam 122 is centered within a boundary 154 of the illumination pupil plane 130.

FIG. 1D is a simplified schematic view of a second illumination pupil plane 130 depicting two illumination beams 122 in a dipole configuration, in accordance with one or more embodiments of the present disclosure. Such a dipole configuration may be well suited for, but is not limited to, overlay measurements along an axis separating the two illumination beams 122. Further, the two illumination beams 122 may provide any combination of incidence angles. For example, as depicted in FIG. 1D, the two illumination beams 122 may be symmetric in the illumination pupil plane 130 to provide opposing incidence angles, through this is not a requirement.

In some embodiments, the two illumination beams 122 are configured (e.g., in accordance with a metrology recipe) to satisfy a Littrow condition for periodic structures in one or more cells 204 of the mosaic overlay target 106. In the Littrow condition, a separation between the illumination beams 122 is equal to A/pitch, where 2L is a wavelength of the illumination beams 122 and pitch is a pitch of the target structures (e.g., along an axis connecting the two illumination beams 122). In this configuration, first-order diffraction (e.g., specular reflection) of an illumination beam 122 from associated features of the mosaic overlay target 106 counter propagates back along the direction of incidence of the illumination beam 122. It is contemplated herein that the Littrow condition may provide relatively robust measurements. However, exact adherence to the Littrow condition is not required. In some cases, a separation between illumination beams 122 in a dipole is selected to be within a certain tolerance for features in one or more cells 204.

FIG. 1E is a simplified schematic view of a third illumination pupil plane 130 depicting four illumination beams 122 in a quadrupole configuration, in accordance with one or more embodiments of the present disclosure. The quadrupole configuration may be considered to be two dipoles with orthogonal orientations. For example, FIG. 1E depicts a first dipole with illumination beams 122*a,b* oriented along the X direction and a second dipole with illumination beams 122*c,d* oriented along the Y direction. In this way, the description of FIG. 1D may also apply to FIG. 1E. For example, a quadrupole configuration of illumination beams 122*a-d* may satisfy the Littrow condition for features oriented along both X and Y directions, noting that the separation distance of dipoles along the X and Y directions may differ. Further, although the separation distance of both dipoles in FIG. 1E is equal, this is not a requirement.

The overlay metrology sub-system 102 may be configured in various ways to image the mosaic overlay target 106 with multiple illumination beams 122. In some embodiments, a single image may be generated based on simultaneous illumination of the mosaic overlay target 106 with multiple illumination beams 122. In this configuration, only one collection channel 148 may be necessary. In some embodiments, the overlay metrology sub-system 102 sequentially illuminates the mosaic overlay target 106 with one or more illumination beams 122 and sequentially generates corresponding images. Such images may be analyzed separately (e.g., by the controller 114) or may be combined (e.g., summed, averaged, or the like) when generating various overlay measurements.

In some embodiments, an overlay metrology sub-system 102 including two collection channels 148 may generate separate (e.g., isolated) images from different illumination beams 122. Such a configuration may be particularly useful for, but is not limited to, optically isolating overlay measurements along different directions. For example, in the case of quadrupole illumination, one or more first images may be generated in a first collection channel 148 based on the first dipole (e.g., illumination beams 122*a,b*) and one or more second images may be generated in a second collection channel 148 based on second dipole (e.g., illumination beams 122*c,d*). Again, the illumination beams 122 may be directed to the mosaic overlay target 106 simultaneously or sequentially. For instance, illumination beams 122*a,c* may be directed to the sample 108 first, followed by illumination beams 122*b,d.*

Isolated images may be generated using any technique known in the art. Continuing the quadrupole example above, the illumination beams 122 in the first and second dipoles may have different properties (e.g., different spectra, different polarizations, or the like). Further, the collection subsystem 124 may include various components (e.g., beamsplitters 150 and/or collection control optics 144 in any of the collection channels 148) to separate or isolate the associated sample light 110 on the detectors 112 in the respective channels. For instance, the beamsplitters 150 and/or collection control optics 144 may include or operate as spectral filters, polarizers, or the like.

Further, referring generally to FIGS. 1C-1E, each illumination beam 122 may have any desired shape corresponding to an incident angle profile and different illumination beams 122 may have different shapes. Various profiles of illumination beams 122 and associated measurement conditions that may be implemented as part of one or more metrology recipes are generally described in U.S. Patent Publication No. 2022/0357674 published on Nov. 10, 2022, which is incorporated herein by reference in its entirety.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mosaic overlay target comprising:

two or more cell sets distributed across a sample, wherein each cell set includes one or more cells having at least one of mirror symmetry with respect to a central axis of the mosaic overlay target or rotational symmetry with respect to a central point of the mosaic overlay target, wherein the two or more cell sets are configured to provide two or more different overlay measurements based on one or more images of the mosaic overlay target, wherein the two or more cell sets comprise:

a first cell set providing a first overlay measurement along a measurement direction, wherein the first cell set includes features on both a first layer of the sample and a second layer of the sample; and a second cell set providing a second overlay measurement along the measurement direction, wherein the second cell set includes additional features on both the first layer of the sample and the second layer of the sample, wherein the first cell set is different than the second cell set and a layout of features in the first cell set is different than a layout of features in the second cell set, wherein the first overlay measurement and the second overlay measurement are alternative overlay measurements of a common property of the sample.

2. The mosaic overlay target of claim 1, wherein the two or more different overlay measurements are associated with two or more patterning processes along a particular measurement direction.

3. The mosaic overlay target of claim 1, wherein the two or more different overlay measurements comprise:

overlay measurements along two or more directions.

4. The mosaic overlay target of claim 1, wherein the two or more different overlay measurements comprise:

overlay measurements generated using two or more different overlay metrology techniques.

5. The mosaic overlay target of claim 4, wherein at least one of the two or more different overlay metrology techniques comprises:

a scatterometry overlay metrology technique.

6. The mosaic overlay target of claim 4, wherein at least one of the two or more different overlay metrology techniques comprises:

an imaging overlay metrology technique.

7. The mosaic overlay target of claim 1, wherein at least one of the two or more cell sets comprises:

one or more cell pairs, each cell pair including two cells, wherein the two cells are oriented to have the at least one of mirror symmetry with respect to the central axis of the mosaic overlay target or rotational symmetry with respect to the central point of the mosaic overlay target.

8. The mosaic overlay target of claim 1, wherein at least one of the two or more cell sets comprises:

a single cell centered on the central point of the mosaic overlay target, wherein the single cell has the at least one of mirror symmetry with respect to the central axis of the mosaic overlay target or rotational symmetry with respect to the central point of the mosaic overlay target.

9. The mosaic overlay target of claim 1, wherein each of the one or more cells in at least one of the two or more cell sets is 180-degree rotationally symmetric.

10. The mosaic overlay target of claim 1, wherein the one or more cells in at least one of the two or more cell sets include periodic features.

11. The mosaic overlay target of claim 10, wherein the periodic features are periodic along a single direction corresponding to a measurement direction.

12. The mosaic overlay target of claim 10, wherein the periodic features are periodic along two directions corresponding to two measurement directions.

13. The mosaic overlay target of claim 1, wherein the one or more cells in at least one of the two or more cell sets include overlapping features on two or more layers of the sample.

14. The mosaic overlay target of claim 13, wherein the overlapping features comprise:

periodic features.

15. The mosaic overlay target of claim 14, wherein the periodic features on the two or more layers have a common periodicity.

16. The mosaic overlay target of claim 14, wherein the periodic features on the two or more layers have different pitches along a particular direction.

17. The mosaic overlay target of claim 14, wherein the periodic features on the two or more layers have different pitches along a particular measurement direction.

18. The mosaic overlay target of claim 14, wherein the periodic features on the two or more layers have different pitches along different measurement directions.

19. A method for designing a mosaic overlay target comprising:

selecting two or more overlay measurements for generation with the mosaic overlay target;

designing two or more cell sets of the mosaic overlay target, wherein the mosaic overlay target comprises:

the two or more cell sets distributed across a sample, wherein each cell set includes one or more cells having at least one of mirror symmetry with respect to a central axis of the mosaic overlay target or rotational symmetry with respect to a central point of the mosaic overlay target, wherein the two or more cell sets are configured to provide two or more different overlay measurements based on one or more images of the mosaic overlay target when imaged, wherein the two or more cell sets comprise:

a first cell set providing a first overlay measurement along a measurement direction, wherein the first cell set includes features on both a first layer of the sample and a second layer of the sample; and a second cell set providing a second overlay measurement along the measurement direction, wherein the second cell set includes additional features on both the first layer of the sample and the second layer of the sample, wherein the first cell set is different than the second cell set and a layout of features in the first cell set is different than a layout of features in the second cell set, wherein the first overlay measurement and the second overlay measurement are alternative overlay measurements of a common property of the sample.

20. The method of claim 19, wherein designing the two or more cell sets of the mosaic overlay target comprise:

designing layouts of features in the two or more cell sets.

* * * * *